(12) United States Patent
Carney et al.

(10) Patent No.: US 11,134,688 B2
(45) Date of Patent: *Oct. 5, 2021

(54) COMPOSITIONS AND METHODS FOR INDIRECTLY REDUCING INCIDENCE OF FUNGAL PATHOGEN ACTIVITY IN PLANTS

(71) Applicant: HELIAE DEVELOPMENT, LLC, Gilbert, AZ (US)

(72) Inventors: Laura Carney, Gilbert, AZ (US); Edgard Jauregui, Casa Grande, AZ (US); Michael Miller, Chandler, AZ (US)

(73) Assignee: Heliae Development, LLC, Gilbert, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/878,164

(22) Filed: May 19, 2020

(65) Prior Publication Data

US 2020/0275666 A1    Sep. 3, 2020

Related U.S. Application Data

(62) Division of application No. 16/567,597, filed on Sep. 11, 2019, now Pat. No. 10,694,751.

(60) Provisional application No. 62/730,897, filed on Sep. 13, 2018, provisional application No. 62/869,430, filed on Jul. 1, 2019.

(51) Int. Cl.
  *A01N 63/30*  (2020.01)
  *A01N 25/02*  (2006.01)
  *A01N 65/03*  (2009.01)

(52) U.S. Cl.
  CPC .............. *A01N 63/30* (2020.01); *A01N 25/02* (2013.01); *A01N 65/03* (2013.01)

(58) Field of Classification Search
  None
  See application file for complete search history.

(56) References Cited

U.S. PATENT DOCUMENTS

| 4,342,751 A ‡ | 8/1982 | Moore | A01N 65/03 424/19 |
| 10,631,543 B2 * | 4/2020 | Carney | A01G 22/05 |
| 10,645,937 B2 * | 5/2020 | Carney | A01N 65/03 |
| 10,694,751 B2 * | 6/2020 | Carney | A01N 63/30 |
| 10,701,941 B2 * | 7/2020 | Carney | A01N 63/10 |
| 2008/0206370 A1 ‡ | 8/2008 | Van Garderen | A01N 65/00 424/74 |
| 2017/0367351 A1 ‡ | 12/2017 | Shinde | C12N 1/12 |
| 2019/0008157 A1 ‡ | 1/2019 | Shinde | A01N 65/03 |
| 2019/0174768 A1 ‡ | 6/2019 | Thiebeauld de la Crouee | C12N 1/12 |

FOREIGN PATENT DOCUMENTS

| CN | 102020705 A | * | 4/2011 |
| CN | 102835692 A | * | 12/2012 |
| CN | 104789478 A | * | 7/2015 |
| CN | 104920608 A | * | 9/2015 |
| CN | 105861371 A | * | 8/2016 |
| CN | 106754545 A | * | 5/2017 |
| EP | 1269847 | ‡ | 1/2003 |
| FR | 2803176 | ‡ | 7/2001 |
| KR | 20090104335 | ‡ | 10/2009 |
| TW | 201912030 | ‡ | 4/2019 |
| WO | WO-2018053075 | ‡ | 3/2018 |
| WO | WO-2018053211 | ‡ | 3/2018 |

OTHER PUBLICATIONS

Chomczynski, et al., "Single-Step Method of RNA Isolation by Acid Guanidinium Thiocyanate-Phnol-Chloroform Extraction", Analytical Biochemistry 162, 156-159 (1987).‡
El-Mougy, et al, "Effect of Commerical Cyanobacteria Products on the Growth and Antagonistic Ability of SOme Bioagents Under Laboratory Conditions", Journal of Pathogens; 2013.‡
Moebius-Clune, et al., "Comprehensive Assessment of Soil Helath— The Cornell Framework", Copyright 2016 Cornell Univeristy. School of Integrative Plant Science (SIPS), Soil and Crop Sciences Section (2016) pp. 61-63.‡

* cited by examiner
‡ imported from a related application

*Primary Examiner* — Alton N Pryor
(74) *Attorney, Agent, or Firm* — Heliae Development, LLC; Adam Lunceford; Veronica-Adele R. Cao

(57) ABSTRACT

Compositions and methods for indirectly reducing incidence of fungal pathogen infection in a plant are disclosed, wherein the fungal pathogen may be *Botrytis, Macrophomina, Rhizoctonia, Sclerotinia,* or *Verticillium.* The compositions comprise pasteurized microalgae cells in an amount effective to reduce incidence of the fungal pathogen in a plant compared to a substantially identical population of untreated plants. The composition treatment can include at least one microalgae such as *Aurantiochytrium, Galdieria, Scenedesmus, Haematococcus, Isochrysis, Spirulina* or any combination thereof.

18 Claims, 13 Drawing Sheets

COMPOSITIONS AND METHODS FOR INDIRECTLY REDUCING INCIDENCE OF FUNGAL PATHOGEN ACTIVITY IN PLANTS

CROSS-REFERENCE TO RELATED APPLICATIONS

This application is a divisional of U.S. application Ser. No. 16/567,597 titled COMPOSITIONS AND METHODS FOR INDIRECTLY REDUCING INCIDENCE OF FUNGAL PATHOGEN ACTIVITY IN PLANTS, filed on Sep. 11, 2019 in the name of the Applicant. U.S. application Ser. No. 16/567,597 in turn claims the benefit of U.S. Provisional Application No. 62/730,897, titled Compositions and Methods for Reducing Incidence of Fungal Pathogen Activity in Plants, which was filed on Sep. 13, 2018 in the name of the Applicant. The application also claims the benefit of U.S. Provisional Application No. 62/869,430, titled Methods of Decreasing Incidence of *Sclerotinia* in Lettuce, which was filed on Jul. 1, 2019 in the name of the Applicant. Both provisional applications are incorporated in full herein by reference.

FIELD OF THE INVENTION

The present invention generally relates to agriculture and, more specifically, to compositions and methods for reducing incidence of fungal pathogens in plants.

BACKGROUND OF THE INVENTION

Fungi are among the most detrimental groups of pathogens that attack plants. Some common examples of fungal pathogens are *Botrytis cinerea, Macrophomina phaseolina, Rhizoctonia solani, Sclerotinia sclerotiorum*, and *Verticillium dahlia*. Infection of agricultural fields by these and other fungal pathogens greatly affects our ability to provide raw plant materials for an ever-increasing population. Whether at a commercial or home garden scale, growers are constantly striving to develop strategies during the growth season which allow the plants to compensate for the influence of the environment and maximize production. Addition of nutrients to the soil or application to the foliage has been proposed to promote yield and quality in certain plants. The effectiveness can be attributable to the ingredients or the method of preparing the product. Therefore, there is a need in the art for compositions and methods for reducing incidence of fungal pathogens in plants.

SUMMARY OF THE INVENTION

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Embodiments of the invention relate to compositions and methods for reducing incidence of fungal pathogens in plants. In some embodiments, the composition can include a microalgae biomass that includes at least one type of microalgae. In some embodiments, the microalgae biomass can include *Chlorella, Aurantiochytrium acetophilum* HS399, *Galdieria, Scenedesmus, Haematococcus, Isochrysis, Spirulina*, or any combination thereof. The composition can include a microalgae biomass that includes at least two types of microalgae, wherein the at least two microalgae are *Chlorella* and/or *Aurantiochytrium acetophilum* HS399.

In some embodiments, the microalgae biomass can include whole biomass and/or residual biomass. Whole biomass (WB) includes substantially all components and fractions of the cells from which the whole biomass is derived. Residual or extracted biomass (EB) can be any remaining biomass after extraction and/or removal of one or more components of a whole biomass.

In some embodiments, the composition can include one type of microalgae. In some embodiments, the composition can include a first microalgae and a second microalgae. The ratio of the first microalgae and the second microalgae can be between about 25:75, 50:50, or 75:25.

In some embodiments, the first microalgae may be *Chlorella* and the second microalgae may be *Aurantiochytrium acetophilum* HS399. In some embodiments, the ratio of *Chlorella* and *Aurantiochytrium acetophilum* HS399 may range between about 25:75 to 75:25. For example, the ratio of *Chlorella* and *Aurantiochytrium acetophilum* HS399 may be about 25:75, 50:50, or 75:25. In some embodiments, the *Chlorella* is whole biomass and *Aurantiochytrium acetophilum* HS399 is residual/extracted biomass. In some embodiments, the *Aurantiochytrium acetophilum* HS399 is whole biomass and *Chlorella* is residual/extracted biomass. In some embodiments, the *Chlorella* and *Aurantiochytrium acetophilum* HS399 are both whole biomass and in other embodiments the *Chlorella* and *Aurantiochytrium acetophilum* HS399 are both residual/extracted biomass.

Some embodiments of the invention relate to a microalgae composition and method of indirectly reducing incidence of fungal pathogens in a plant by administering the microalgae composition treatment to the soil within the immediate vicinity of the seed, seedling, or plant. Some embodiments of the invention relate to a microalgae composition and method of directly reducing incidence of fungal pathogens in a plant by administering the microalgae composition treatment directly to the seed, seedling, or plant.

Embodiments of the invention relate to a method of indirectly reducing incidence of fungal pathogens in a plant by administering a microalgae composition treatment comprising at least one microalgae to the soil within the immediate vicinity of the seed, seedling, or plant. The administering may be by drip irrigation or by soil drench once at the time of seeding. The method can include growing the plant to a transplant stage. The method can include transferring the plant at the transplant stage from an initial container to a larger container or a field, or the like. In some embodiments the plant at the transplant stage has at least one enhanced plant characteristic. The enhanced plant characteristic can be improved growth, yield, post-harvest fruit quality, root density, improved root area, enhanced plant vigor, enhanced plant growth rate, enhanced plant maturation, enhanced shoot development, and/or enhanced plant resistance to fungal pathogens. The composition treatment can include at least one microalgae such as, *Chlorella, Aurantiochytrium acetophilum* HS399, *Galdieria, Scenedesmus, Haematococcus, Isochrysis* or *Spirulina* and/or the like.

In some of the embodiments and Examples below, the microalgae composition may be applied to the soil within the immediate vicinity of the plant by drip irrigation or by drenching the soil initially at the time of transplant. The microalgae composition may then be added subsequently at a specified interval (e.g. once every 14 days) after transplant until harvest. After the transfer, the plant may have at least one enhanced plant characteristic. The enhanced plant characteristic can be improved growth, yield, post-harvest fruit quality, root density, improved root area, enhanced plant vigor, enhanced plant growth rate, enhanced plant maturation, enhanced shoot development, and/or enhanced plant resistance to fungal pathogens. The composition treatment can include at least one microalgae such as, *Chlorella, Aurantiochytrium acetophilum* HS399, *Galdieria, Scenedesmus, Haematococcus, Isochrysis* or *Spirulina* and/ or the like.

In some of the embodiments and Examples below, the microalgae composition may be applied to the soil within the immediate vicinity of the plant by drip irrigation or by drenching the soil initially at the time of seeding. The microalgae composition may then be added subsequently at a specified interval (e.g. three weeks) after seeding. A few weeks after seeding, some plants developed at least one enhanced plant characteristic. The enhanced plant characteristic can be improved growth, yield, post-harvest fruit quality, root density, improved root area, enhanced plant vigor, enhanced plant growth rate, enhanced plant maturation, enhanced shoot development, and/or enhanced plant resistance to fungal pathogens. The composition treatment can include at least one microalgae such as, *Chlorella, Aurantiochytrium acetophilum* HS399, *Galdieria, Scenedesmus, Haematococcus, Isochrysis* or *Spirulina* and/ or the like.

In accordance with one embodiment of the present invention, a method of reducing incidence of fungal pathogen infection in a plant is disclosed. The method comprises administering to soil in the immediate vicinity of a plant, seedling, or seed an amount of a microalgae composition that is effective to reduce incidence of the fungal pathogen in the plant compared to a substantially identical population of untreated plants.

In accordance with one embodiment of the present invention, a liquid composition for administering to soil in the immediate vicinity of a plant, seedling, or seed is disclosed. The liquid composition comprises an amount of pasteurized microalgae cells that is effective to reduce incidence of the fungal pathogen in the plant compared to a substantially identical population of untreated plants, wherein the pasteurized microalgae cells comprise at least one of pasteurized *Chlorella*, pasteurized *Aurantiochytrium acetophilum* HS399 cells, pasteurized *Galdieria* cells, pasteurized *Scenedesmus* cells, pasteurized *Haematococcus* cells, pasteurized *Isochrysis* cells, and pasteurized *Spirulina* cells.

Although the Examples below specifically identify *Botrytis, Macrophomina, Rhizoctonia solani, Sclerotinia sclerotiorum*, and *Verticillium* as types of fungal pathogens, it should be clearly understood that substantial benefit may also be achieved from using the compositions and methods herein to reduce incidence of other fungal pathogens.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The present application is further detailed with respect to the following drawings. These figures are not intended to limit the scope of the present application, but rather, illustrate certain attributes thereof.

DETAILED DESCRIPTION OF THE INVENTION

Figure 1:
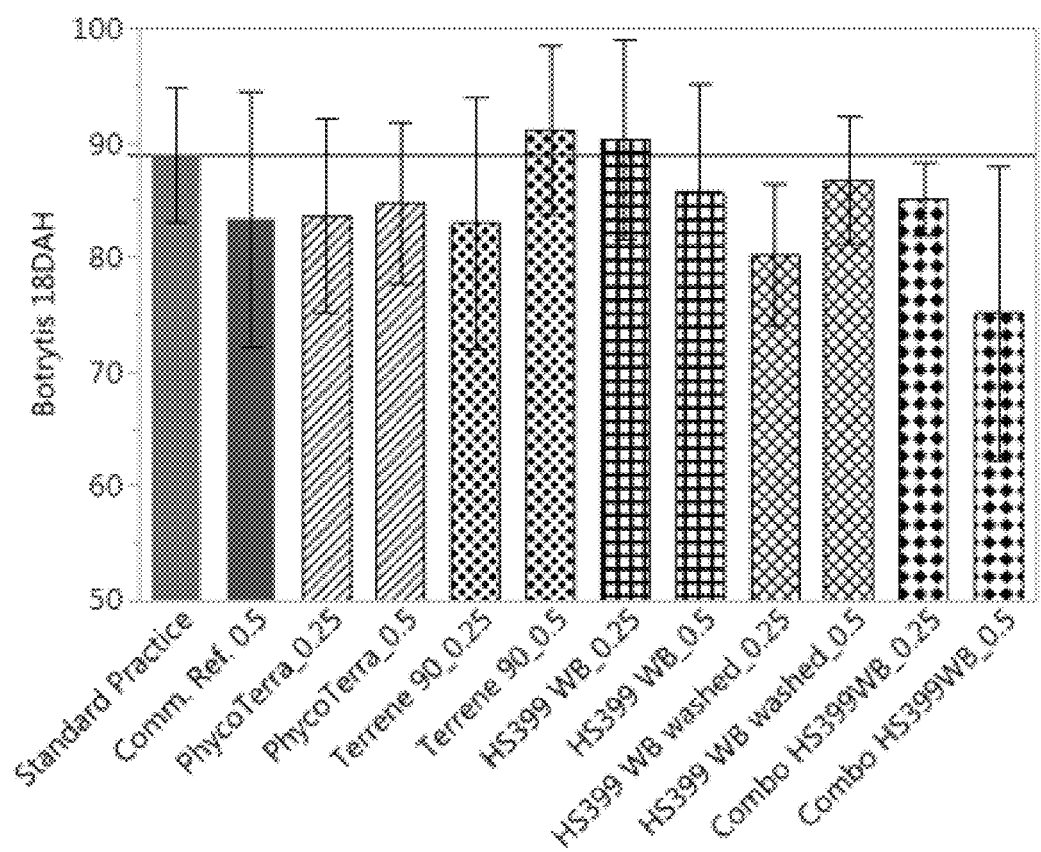
FIG. 1 is a graph showing a comparison of the effects of several microalgae compositions on strawberry quality, wherein the effects are observed in a decrease in incidence of *Botrytis* relative to the UTC and a seaweed commercial reference product.

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

Many plants can benefit from the application of liquid compositions that provide a bio-stimulatory effect. Non-limiting examples of plant families that can benefit from such compositions include plants from the following: Solanaceae, Fabaceae (Leguminosae), Poaceae, Roasaceae, Vitaceae, Brassicaceae (Cruciferae), Caricaceae, Malvaceae, Sapindaceae, Anacardiaceae, Rutaceae, Moraceae, Convolvulaceae, Lamiaceae, Verbenaceae, Pedaliaceae, Asteraceae (Compositae), Apiaceae (Umbelliferae), Araliaceae, Oleaceae, Ericaceae, Actinidaceae, Cactaceae, Chenopodiaceae, Polygonaceae, Theaceae, Lecythidaceae, Rubiaceae, Papveraceae, Illiciaceae Grossulariaceae, Myrtaceae, Juglandaceae, Bertulaceae, Cucurbitaceae, Asparagaceae (Liliaceae), Alliaceae (Liliceae), Bromeliaceae, Zingieraceae, Muscaceae, Areaceae, Dioscoreaceae, Myristicaceae, Annonaceae, Euphorbiaceae, Lauraceae, Piperaceae, Proteaceae, and Cannabaceae.

The Solanaceae plant family includes a large number of agricultural crops, medicinal plants, spices, and ornamentals in its over 2,500 species. Taxonomically classified in the Plantae kingdom, Tracheobionta (subkingdom), Spermatophyta (superdivision), Magnoliophyta (division), Manoliopsida (class), Asteridae (subclass), and Solanales (order), the Solanaceae family includes, but is not limited to, potatoes, tomatoes, eggplants, various peppers, tobacco, and petunias. Plants in the Solanaceae can be found on all the continents, excluding Antarctica, and thus have a widespread importance in agriculture across the globe.

The Rosaceae plant family includes flowering plants, herbs, shrubs, and trees. Taxonomically classified in the Plantae kingdom, Tracheobionta (subkingdom), Spermatophyta (superdivision), Magnoliophyta (division), Magnoliopsida (class), Rosidae (subclass), and Rosales (order), the Rosaceae family includes, but is not limited to, almond, apple, apricot, blackberry, cherry, nectarine, peach, plum, raspberry, strawberry, and quince.

The Fabaceae plant family (also known as the Leguminosae) comprises the third largest plant family with over 18,000 species, including a number of important agricultural and food plants. Taxonomically classified in the Plantae kingdom, Tracheobionta (subkingdom), Spermatophyta (superdivision), Magnoliophyta (division), Manoliopsida (class), Rosidae (subclass), and Fabales (order), the Fabaceae family includes, but is not limited to, soybeans, beans, green beans, peas, chickpeas, alfalfa, peanuts, sweet peas, carob, and liquorice. Plants in the Fabaceae family can range in size and type, including but not limited to, trees, small annual herbs, shrubs, and vines, and typically develop legumes. Plants in the Fabaceae family can be found on all the continents, excluding Antarctica, and thus have a widespread importance in agriculture across the globe. Besides food, plants in the Fabaceae family can be used to produce natural gums, dyes, and ornamentals.

The Poaceae plant family supplies food, building materials, and feedstock for fuel processing. Taxonomically classified in the Plantae kingdom, Tracheobionta (subkingdom), Spermatophyta (superdivision), Magnoliophyta (division), Liliopsida (class), Commelinidae (subclass), and Cyperales (order), the Poaceae family includes, but is not limited to, flowering plants, grasses, and cereal crops such as barley, corn, lemongrass, millet, oat, rye, rice, wheat, sugarcane, and sorghum. Types of turf grass found in Arizona include, but are not limited to, hybrid Bermuda grasses (e.g., 328 tifgrn, 419 tifway, tif sport).

The Vitaceae plant family includes flowering plants and vines. Taxonomically classified in the Plantae kingdom, Tracheobionta (subkingdom), Spermatophyta (superdivision), Magnoliophyta (division), Magnoliopsida (class), Rosidae (subclass), and Rhammales (order), the Vitaceae family includes, but is not limited to, grapes.

The Brassicaceae (Cruciferae) plant family includes flowering plants and is commonly referred to as mustards, crucifers, or the cabbage family. The Brassicaceae family includes broccoli, cauliflower, cabbage, kale, collards, radish, *Arabidopsis* (rockcress), and rapeseed. Canola oil is a vegetable oil derived from rapeseed.

Important in the production of marketable fruit from plants is the yield and quality of fruit, which can be quantified as the number, weight, color, firmness, ripeness, sweetness, moisture, degree of insect infestation, degree of disease or rot, or degree of sunburn of the fruit. A composition and method of directly improving the health of the plant and its resistance to fungal pathogens to enable robust production of fruit is valuable in increasing the efficiency of marketable production. And a composition and method of indirectly improving the health of the plant and its resistance to fungal pathogens by enhancing the plant's soil microbiome is equally valuable. Marketable and unmarketable designations can apply to both the plant and fruit, and can be defined differently based on the end use of the product, such as but not limited to, fresh market produce and processing for inclusion as an ingredient in a composition. The marketable determination can assess such qualities as, but not limited to, color, insect damage, incidence of fungal pathogen, blossom end rot, softness, and sunburn. The term "total production" can incorporate both marketable and unmarketable plants and fruit. The ratio of marketable plants or fruit to unmarketable plants or fruit can be referred to as "utilization" and expressed as a percentage. The utilization can be used as an indicator of the efficiency of the agricultural process as it shows the successful production of marketable plants or fruit, which will be obtain the highest financial return for the grower, whereas total production will not provide such an indication.

To achieve such improvements in plant health and resistance to fungal pathogens, compositions and methods to treat such seeds, seedlings, plants, and soil with a low-concentration, microalgae-based composition in a liquid solution form were developed and are disclosed herein.

The term "microalgae" as used herein refers to microscopic single-cell organisms such as microalgae, cyanobacteria, algae, diatoms, dinoflagellates, freshwater organisms, marine organisms, or other similar single cell organisms capable of growth in phototrophic, mixotrophic, or heterotrophic culture conditions. Microalgae can be grown in heterotrophic, mixotrophic, and phototrophic conditions. Culturing microalgae in heterotrophic conditions comprises supplying organic carbon (e.g., acetic acid, acetate, glucose) to cells in an aqueous culture medium comprising trace metals and nutrients (e.g., nitrogen, phosphorus). Culturing microalgae in mixotrophic conditions comprises supplying light and organic carbon (e.g., acetic acid, acetate, glucose) to cells in an aqueous culture medium comprising trace metals and nutrients (e.g., nitrogen, phosphorus). Culturing microalgae in phototrophic conditions comprises supplying light and inorganic carbon (e.g., carbon dioxide) to cells in an aqueous culture medium comprising trace metals and nutrients (e.g., nitrogen, phosphorus).

In some embodiments, the microalgae cells can be harvested from a culture and used as whole cells in a liquid composition for application to seeds, seedlings, plants and soil, while in other embodiments the harvested microalgae cells can be subjected to downstream processing and the resulting liquid composition (e.g., suspension, solution) may be used for application to plants, soil, or a combination thereof. Non-limiting examples of downstream processing comprise: lysing the cells and subjecting the harvested cells to a solvent or supercritical carbon dioxide extraction process to isolate an oil or protein. In some embodiments, the extracted (i.e., residual) biomass remaining from an extraction process can be used alone or in combination with other microalgae or extracts in a liquid composition for application to plants, soil, or a combination thereof. By subjecting the microalgae to an extraction process the resulting biomass is transformed from a natural whole state to a lysed condition where the cell is missing a significant amount of the natural components, thus differentiating the extracted microalgae biomass from that which is found in nature. Excreted products from the microalgae can also be isolated from a microalgae culture using downstream processing methods.

In some embodiments, microalgae can be the predominant active ingredient source in the composition. In some embodiments, the microalgae population of the composition can include whole biomass, substantially extracted biomass, excreted products (e.g., EPS), extracted protein, or extracted oil. In some embodiments, microalgae include at least 99% of the active ingredient sources of the composition. In some embodiments, microalgae include at least 95% of the active ingredient sources of the composition. In some embodiments, microalgae include at least 90% of the active ingredient sources of the composition. In some embodiments, microalgae include at least 80% of the active ingredient sources of the composition. In some embodiments, microalgae include at least 70% of the active ingredient sources of the composition. In some embodiments, microalgae include at least 60% of the active ingredient sources of the composition. In some embodiments, microalgae include at least 50% of the active ingredient sources of the composition. In some embodiments, microalgae include at least 40% of the active ingredient sources of the composition. In some embodiments, microalgae include at least 30% of the active ingredient sources of the composition. In some embodiments, microalgae include at least 20% of the active ingredient sources of the composition. In some embodiments, microalgae include at least 10% of the active ingredient sources of the composition. In some embodiments, microalgae include at least 5% of the active ingredient sources of the composition. In some embodiments, microalgae include at least 1% of the active ingredient sources of the composition. In some embodiments, the composition lacks any detectable amount of any other active ingredient source other than microalgae.

In some embodiments, microalgae biomass, excreted product, or extracts can also be sourced from multiple types of microalgae, to make a composition that is beneficial when applied to plants or soil. Non-limiting examples of microalgae that can be used in the compositions and methods of the present invention include microalgae in the classes: Eustigmatophyceae, Chlorophyceae, Prasinophyceae, Haptophyceae, Cyanidiophyceae, Prymnesiophyceae, Porphyridiophyceae, Labyrinthulomycetes, Trebouxiophyceae, Bacillariophyceae, and Cyanophyceae. The class Cyanidiophyceae includes species of *Galdieria*. The class Chlorophyceae includes species of *Haematococcus, Scenedesmus, Chlamydomonas,* and *Micractinium*. The class Prymnesiophyceae includes species of *Isochrysis* and *Pavlova*. The class Eustigmatophyceae includes species of *Nannochloropsis*. The class Porphyridiophyceae includes species of *Porphyridium*. The class Labyrinthulomycetes includes species of *Schizochytrium* and *Aurantiochytrium*. The class Prasinophyceae includes species of *Tetraselmis*. The class Trebouxiophyceae includes species of *Chlorella* and *Botryococcus*. The class Bacillariophyceae includes species of *Phaeodactylum*. The class Cyanophyceae includes species of *Spirulina*.

Non-limiting examples of microalgae genus and species that can be used in the compositions and methods of the present invention include: *Achnanthes orientalis, Agmenellum* spp., *Amphiprora hyaline, Amphora coffeiformis, Amphora coffeiformis* var. *linea, Amphora coffeiformis* var. *punctata, Amphora coffeiformis* var. *taylori, Amphora coffeiformis* var. *tenuis, Amphora delicatissima, Amphora delicatissima* var. *capitata, Amphora* sp., *Anabaena, Ankistrodesmus, Ankistrodesmus falcatus, Aurantiochytrium* sp., *Boekelovia hooglandii, Borodinella* sp., *Botryococcus braunii, Botryococcus sudeticus, Bracteococcus minor, Bracteococcus medionucleatus, Carteria, Chaetoceros gra-*

*cilis, Chaetoceros muelleri, Chaetoceros muelleri* var. *subsalsum, Chaetoceros* sp., *Chlamydomonas* sp., *Chlamydomas perigranulata, Chlorella anitrata, Chlorella antarctica, Chlorella aureoviridis, Chlorella Candida, Chlorella capsulate, Chlorella desiccate, Chlorella ellipsoidea, Chlorella emersonii, Chlorella fusca, Chlorella fusca* var. *vacuolate, Chlorella glucotropha, Chlorella infusionum, Chlorella infusionum* var. *actophila, Chlorella infusionum* var. *auxenophila, Chlorella kessleri, Chlorella lobophora, Chlorella luteoviridis, Chlorella luteoviridis* var. *aureoviridis, Chlorella luteoviridis* var. *lutescens, Chlorella miniata, Chlorella minutissima, Chlorella mutabilis, Chlorella nocturna, Chlorella ovalis, Chlorella parva, Chlorella photophila, Chlorella pringsheimii, Chlorella protothecoides, Chlorella protothecoides* var. *acidicola, Chlorella regularis, Chlorella regularis* var. *minima, Chlorella regularis* var. *umbricata, Chlorella reisiglii, Chlorella saccharophila, Chlorella saccharophila* var. *ellipsoidea, Chlorella salina, Chlorella simplex, Chlorella sorokiniana, Chlorella* sp., *Chlorella sphaerica, Chlorella stigmatophora, Chlorella vanniellii, Chlorella vulgaris, Chlorella vulgaris* fo. *tertia, Chlorella vulgaris* var. *autotrophica, Chlorella vulgaris* var. *viridis, Chlorella vulgaris* var. *vulgaris, Chlorella vulgaris* var. *vulgaris* fo. *tertia, Chlorella vulgaris* var. *vulgaris* fo. *viridis, Chlorella xanthella, Chlorella zofingiensis, Chlorella trebouxioides, Chlorella vulgaris, Chlorococcum infusionum, Chlorococcum* sp., *Chlorogonium, Chroomonas* sp., *Chrysosphaera* sp., *Cricosphaera* sp., *Crypthecodinium cohnii, Cryptomonas* sp., *Cyclotella cryptica, Cyclotella meneghiniana, Cyclotella* sp., *Dunaliella* sp., *Dunaliella bardawil, Dunaliella bioculata, Dunaliella granulate, Dunaliella maritime, Dunaliella minuta, Dunaliella parva, Dunaliella peircei, Dunaliella primolecta, Dunaliella salina, Dunaliella terricola, Dunaliella tertiolecta, Dunaliella viridis, Dunaliella tertiolecta, Eremosphaera viridis, Eremosphaera* sp., *Ellipsoidon* sp., *Euglena* spp., *Franceia* sp., *Fragilaria crotonensis, Fragilaria* sp., *Galdieria* sp., *Gleocapsa* sp., *Gloeothamnion* sp., *Haematococcus pluvialis, Hymenomonas* sp., *Isochrysis* a.ff *galbana, Isochrysis galbana, Lepocinclis, Micractinium, Monoraphidium minutum, Monoraphidium* sp., *Nannochloris* sp., *Nannochloropsis salina, Nannochloropsis* sp., *Navicula acceptata, Navicula biskanterae, Navicula pseudotenelloides, Navicula pelliculosa, Navicula saprophila, Navicula* sp., *Nephrochloris* sp., *Nephroselmis* sp., *Nitschia communis, Nitzschia alexandrina, Nitzschia closterium, Nitzschia communis, Nitzschia dissipata, Nitzschia frustulum, Nitzschia hantzschiana, Nitzschia inconspicua, Nitzschia intermedia, Nitzschia microcephala, Nitzschia pusilla, Nitzschia pusilla elliptica, Nitzschia pusilla monoensis, Nitzschia quadrangular, Nitzschia* sp., *Ochromonas* sp., *Oocystis parva, Oocystis pusilla, Oocystis* sp., *Oscillatoria limnetica, Oscillatoria* sp., *Oscillatoria subbrevis, Parachlorella kessleri, Pascheria acidophila, Pavlova* sp., *Phaeodactylum tricornutum, Phagus, Phormidium, Platymonas* sp., *Pleurochrysis camerae, Pleurochrysis dentate, Pleurochrysis* sp., *Porphyridium* sp., *Prototheca wickerhamii, Prototheca stagnora, Prototheca portoricensis, Prototheca moriformis, Prototheca zopfii, Pseudochlorella aquatica, Pyramimonas* sp., *Pyrobotrys, Rhodococcus opacus, Sarcinoid chrysophyte, Scenedesmus armatus, Schizochytrium, Spirogyra, Spirulina platensis, Stichococcus* sp., *Synechococcus* sp., *Synechocystisf, Tagetes erecta, Tagetes patula, Tetraedron, Tetraselmis* sp., *Tetraselmis suecica, Thalassiosira weissflogii*, and *Viridiella fridericiana*.

Analysis of the DNA sequence of the strain of *Chlorella* sp. described in the specification was done in the NCBI 18s rDNA reference database at the Culture Collection of Algae at the University of Cologne (CCAC) showed substantial similarity (i.e., greater than 95%) with multiple known strains of *Chlorella* and *Micractinium*. Those of skill in the art will recognize that *Chlorella* and *Micractinium* appear closely related in many taxonomic classification trees for microalgae, and strains and species may be re-classified from time to time. Thus, for references throughout the instant specification for *Chlorella* sp., it is recognized that microalgae strains in related taxonomic classifications with similar characteristics to the reference *Chlorella* sp. strain would reasonably be expected to produce similar results.

Additionally, taxonomic classification has also been in flux for organisms in the genus *Schizochytrium*. Some organisms previously classified as *Schizochytrium* have been reclassified as *Aurantiochytrium, Thraustochytrium*, or *Oblongichytrium*. See Yokoyama et al. Taxonomic rearrangement of the genus *Schizochytrium* [sensu lato] based on morphology, chemotaxonomic characteristics, and 18S rRNA gene phylogeny (Thrausochytriaceae, Labyrinthulomycetes): emendation for *Schizochytrium* and erection of *Aurantiochytrium* and *Oblongichytrium* gen. nov. *Mycoscience* (2007) 48:199-211. Those of skill in the art will recognize that *Schizochytrium, Aurantiochytrium, Thraustochytrium*, and *Oblongichytrium* appear closely related in many taxonomic classification trees for microalgae, and strains and species may be re-classified from time to time. Thus, for references throughout the instant specification for *Schizochytrium*, it is recognized that microalgae strains in related taxonomic classifications with similar characteristics to *Schizochytrium* would reasonably be expected to produce similar results. Furthermore, with respect to all references to "*Aurantiochytrium acetophilum* HS399" herein, pursuant to the requirements of the Budapest Treaty, a live culture of the *Aurantiochytrium acetophilum* HS399 microalgae strain described herein was deposited on Sep. 5, 2019 at National Center for Marine Algae and Microbiota (NCMA), located at 60 Bigelow Drive, East Boothbay, Me. 04544, USA and received accession number 201909001.

By artificially controlling aspects of the microalgae culturing process such as the organic carbon feed (e.g., acetic acid, acetate), oxygen levels, pH, and light, the culturing process differs from the culturing process that microalgae experiences in nature. In addition to controlling various aspects of the culturing process, intervention by human operators or automated systems occurs during the non-axenic mixotrophic culturing of microalgae through contamination control methods to prevent the microalgae from being overrun and outcompeted by contaminating organisms (e.g., fungi, bacteria). Contamination control methods for microalgae cultures are known in the art and such suitable contamination control methods for non-axenic mixotrophic microalgae cultures are disclosed in WO2014/074769A2 (Ganuza, et al.) which is incorporated herein by reference. By intervening in the microalgae culturing process, the impact of the contaminating microorganisms can be mitigated by suppressing the proliferation of containing organism populations and the effect on the microalgal cells (e.g., lysing, infection, death, clumping). Thus, through artificial control of aspects of the culturing process and intervening in the culturing process with contamination control methods, the microalgae culture produced as a whole and used in the described inventive compositions differs from the culture that results from a microalgae culturing process that occurs in nature.

During the mixotrophic culturing process the microalgae culture can also include cell debris and compounds excreted from the microalgae cells into the culture medium. The output of the microalgae mixotrophic culturing process provides the active ingredient for composition that is applied to seeds, seedlings, plants, or soil for improving yield and quality without separate addition to or supplementation of the composition with other active ingredients not found in the mixotrophic microalgae whole cells and accompanying culture medium from the mixotrophic culturing process such as, but not limited to: microalgae extracts, macroalgae, macroalgae extracts, liquid fertilizers, granular fertilizers, mineral complexes (e.g., calcium, sodium, zinc, manganese, cobalt, silicon), fungi, bacteria, nematodes, protozoa, digestate solids, chemicals (e.g., ethanolamine, borax, boric acid), humic acid, nitrogen and nitrogen derivatives, phosphorus rock, pesticides, herbicides, insecticides, enzymes, plant fiber (e.g., coconut fiber).

In some embodiments, the microalgae can be previously frozen and thawed before inclusion in the liquid composition. In some embodiments, the microalgae may not have been subjected to a previous freezing or thawing process. In some embodiments, the microalgae whole cells have not been subjected to a drying process. The cell walls of the microalgae of the composition have not been lysed or disrupted, and the microalgae cells have not been subjected to an extraction process or process that pulverizes the cells. The microalgae whole cells are not subjected to a purification process for isolating the microalgae whole cells from the accompanying constituents of the culturing process (e.g., trace nutrients, residual organic carbon, bacteria, cell debris, cell excretions), and thus the whole output from the microalgae culturing process comprising whole microalgae cells, culture medium, cell excretions, cell debris, bacteria, residual organic carbon, and trace nutrients, is used in the liquid composition for application to plants. In some embodiments, the microalgae whole cells and the accompanying constituents of the culturing process are concentrated in the composition. In some embodiments, the microalgae whole cells and the accompanying constituents of the culturing process are diluted in the composition to a low concentration. The microalgae whole cells of the composition are not fossilized. In some embodiments, the microalgae whole cells are not maintained in a viable state in the composition for continued growth after the method of using the composition in a soil or foliar application. In some embodiments, the microalgae base composition can be biologically inactive after the composition is prepared. In some embodiments, the microalgae base composition can be substantially biologically inactive after the composition is prepared. In some embodiments, the microalgae base composition can increase in biological activity after the prepared composition is exposed to air.

In some embodiments, a liquid composition can include low concentrations of bacteria contributing to the solids percentage of the composition in addition to the microalgae cells. Examples of bacteria found in non-axenic mixotrophic conditions can be found in WO2014/074769A2 (Ganuza, et al.), hereby incorporated by reference. A live bacteria count can be determined using methods known in the art such as plate counts, plates counts using Petrifilm available from 3M (St. Paul, Minn.), spectrophotometric (turbidimetric) measurements, visual comparison of turbidity with a known standard, direct cell counts under a microscope, cell mass determination, and measurement of cellular activity. Live bacteria counts in a non-axenic mixotrophic microalgae culture can range from $10^4$ to $10^9$ CFU/mL, and can depend on contamination control measures taken during the culturing of the microalgae. The level of bacteria in the composition can be determined by an aerobic plate count which quantifies aerobic colony forming units (CFU) in a designated volume. In some embodiments, the composition includes an aerobic plate count of 40,000-400,000 CFU/mL. In some embodiments, the composition includes an aerobic plate count of 40,000-100,000 CFU/mL. In some embodiments, the composition includes an aerobic plate count of 100,000-200,000 CFU/mL. In some embodiments, the composition includes an aerobic plate count of 200,000-300,000 CFU/mL. In some embodiments, the composition includes an aerobic plate count of 300,000-400,000 CFU/mL.

In some embodiments, the microalgae based composition can be supplemented with a supplemental nutrient such as nitrogen, phosphorus, or potassium to increase the levels within the composition to at least 1% of the total composition (i.e., addition of N, P, or K to increase levels at least 1-0-0, 0-1-0, 0-0-1, or combinations thereof). In some embodiments, the microalgae composition can be supplemented with nutrients such as, but not limited to, calcium, magnesium, silicon, sulfur, iron, manganese, zinc, copper, boron, molybdenum, chlorine, sodium, aluminum, vanadium, nickel, cerium, dysprosium, erbium, europium, gadolinium, holmium, lanthanum, lutetium, neodymium, praseodymium, promethium, samarium, scandium, terbium, thulium, ytterbium, and yttrium. In some embodiments, the supplemented nutrient is not uptaken, chelated, or absorbed by the microalgae. In some embodiments, the concentration of the supplemental nutrient can include 1-50 g per 100 g of the composition.

A liquid composition comprising microalgae can be stabilized by heating and cooling in a pasteurization process. In some embodiments, the active ingredients of the microalgae based composition may maintain effectiveness in at least one characteristic of a plant after being subjected to the heating and cooling of a pasteurization process. In other embodiments, liquid compositions with whole cells or processed cells (e.g., lysed, extracted) of microalgae cells may not need to be stabilized by pasteurization. For example, microalgae cells that have been processed, such as by lysing and extraction, or extracts can include such low levels of bacteria that a liquid composition can remain stable without being subjected to the heating and cooling of a pasteurization process.

In some embodiments, the composition can be heated to a temperature in the range of 50-130° C. In some embodiments, the composition can be heated to a temperature in the range of 55-65° C. In some embodiments, the composition can be heated to a temperature in the range of 58-62° C. In some embodiments, the composition can be heated to a temperature in the range of 50-60° C. In some embodiments, the composition can be heated to a temperature in the range of 60-90° C. In some embodiments, the composition can be heated to a temperature in the range of 70-80° C. In some embodiments, the composition can be heated to a temperature in the range of 100-150° C. In some embodiments, the composition can be heated to a temperature in the range of 120-130° C.

In some embodiments, the composition can be heated for a time period in the range of 1-150 minutes. In some embodiments, the composition can be heated for a time period in the range of 110-130 minutes. In some embodiments, the composition can be heated for a time period in the range of 90-100 minutes. In some embodiments, the composition can be heated for a time period in the range of 100-110 minutes. In some embodiments, the composition can be heated for a time period in the range of 110-120 minutes. In some embodiments, the composition can be heated for a time period in the range of 120-130 minutes. In some embodiments, the composition can be heated for a time period in the range of 130-140 minutes. In some embodiments, the composition can be heated for a time period in the range of 140-150 minutes. In some embodiments, the composition is heated for less than 15 min. In some embodiments, the composition is heated for less than 2 min.

After the step of heating or subjecting the liquid composition to high temperatures is complete, the compositions can be cooled at any rate to a temperature that is safe to work with. In one non-limiting embodiment, the composition can be cooled to a temperature in the range of 35-45° C. In some embodiments, the composition can be cooled to a temperature in the range of 36-44° C. In some embodiments, the composition can be cooled to a temperature in the range of 37-43° C. In some embodiments, the composition can be cooled to a temperature in the range of 38-42° C. In some embodiments, the composition can be cooled to a temperature in the range of 39-41° C. In further embodiments, the pasteurization process can be part of a continuous production process that also involves packaging, and thus the liquid composition can be packaged (e.g., bottled) directly after the heating or high temperature stage without a cooling step.

In some embodiments, the composition can include 5-30% solids by weight of microalgae cells (i.e., 5-30 g of microalgae cells/100 mL of the liquid composition). In some embodiments, the composition can include 5-20% solids by weight of microalgae cells. In some embodiments, the composition can include 5-15% solids by weight of microalgae cells. In some embodiments, the composition can include 5-10% solids by weight of microalgae cells. In some embodiments, the composition can include 10-20% solids by weight of microalgae cells. In some embodiments, the composition can include 10-20% solids by weight of microalgae cells. In some embodiments, the composition can include 20-30% solids by weight of microalgae cells. In some embodiments, further dilution of the microalgae cells percent solids by weight can occur before application for low concentration applications of the composition.

In some embodiments, the composition can include less than 1% by weight of microalgae biomass or extracts (i.e., less than 1 g of microalgae derived product/100 mL of the liquid composition). In some embodiments, the composition can include less than 0.9% by weight of microalgae biomass or extracts. In some embodiments, the composition can include less than 0.8% by weight of microalgae biomass or extracts. In some embodiments, the composition can include less than 0.7% by weight of microalgae biomass or extracts. In some embodiments, the composition can include less than 0.6% by weight of microalgae biomass or extracts. In some embodiments, the composition can include less than 0.5% by weight of microalgae biomass or extracts. In some embodiments, the composition can include less than 0.4% by weight of microalgae biomass or extracts. In some embodiments, the composition can include less than 0.3% by weight of microalgae biomass or extracts. In some embodiments, the composition can include less than 0.2% by weight of microalgae biomass or extracts. In some embodiments, the composition can include less than 0.1% by weight of microalgae biomass or extracts. In some embodiments, the composition can include at least 0.0001% by weight of microalgae biomass or extracts. In some embodiments, the composition can include at least 0.001% by weight of microalgae biomass or extracts. In some embodiments, the composition can include at least 0.01% by weight of microalgae biomass or extracts. In some embodiments, the composition can include at least 0.1% by weight of microalgae biomass or extracts. In some embodiments, the composition can include 0.0001-1% by weight of microalgae biomass or extracts. In some embodiments, the composition can include 0.0001-0.001% by weight of microalgae biomass or extracts. In some embodiments, the composition can include 0.001-0.01% by weight of microalgae biomass or extracts. In some embodiments, the composition can include 0.01-0.1% by weight of microalgae biomass or extracts. In some embodiments, the composition can include 0.1-1% by weight of microalgae biomass or extracts.

In some embodiments, an application concentration of 0.1% of microalgae biomass or extract equates to 0.04 g of microalgae biomass or extract in 40 mL of a composition. While the desired application concentration to a plant can be 0.1% of microalgae biomass or extract, the composition can be packaged as a 10% concentration (0.1 mL in 1.0 mL of a composition). Thus, a desired application concentration of 1.6% would require 6,000 mL of the 10% microalgae biomass or extract in the 100 gallons of water applied to the assumption of 15,000 plants in an acre, which is equivalent to an application rate of about 1.585 gallons per acre. In some embodiments, a desired application concentration of 0.01% of microalgae biomass or extract using a 10% concentration composition equates to an application rate of about 0.159 gallons per acre. In some embodiments, a desired application concentration of 0.001% of microalgae biomass or extract using a 10% concentration composition equates to an application rate of about 0.016 gallons per acre. In some embodiments, a desired application concentration of 0.0001% of microalgae biomass or extract using a 10% concentration composition equates to an application rate of about 0.002 gallons per acre.

In another non-limiting embodiment, correlating the application of the microalgae biomass or extract on a per plant basis using the assumption of 15,000 plants per acre, the composition application rate of 1 gallon per acre is equal to about 0.2523 mL per plant=0.025 g per plant=25.0 mg of microalgae biomass or extract per plant. The water requirement assumption of 100 gallons per acre is equal to about 25 mL of water per plant. Therefore, 0.025 g of microalgae biomass or extract in 25 mL of water is equal to about a 0.1% application concentration. In some embodiments, the microalgae biomass or extract based composition can be applied at a rate in a range as low as about 0.001-10 gallons per acre, or as high as up to 150 gallons per acre.

In some of the embodiments and Examples below, the applications were performed using a 6-10% solids solution by weight microalgae composition. For greenhouse trials, the rates vary and essentially refer to how much volume of the 6-10% solids solution was added in a given volume of water (e.g. 1% v/v-4% v/v). Similarly, for lab trials, the rates may have varied between 0.5% v/v-5.0% v/v. For field trials, the rates are indicated in gal/acre and the amount of carrier water would be determined according to user preference. For field trials, the application rate may range between 0.25 gal/acre-1 gal/acre. For example, in the greenhouse trial where the application rate is 1% v/v, the microalgae composition would contain approximately 4 g of microalgae/gal (as there is roughly 400 g of solid microalgae/gal) and where the application rate is 4% v/v, the microalgae composition would contain approximately 16 g of microalgae/gal. In the lab trials, where the application rate is 0.5% v/v, the microalgae composition would contain approximately 2 g of microalgae/gal and where the application rate is 5.0% v/v, the microalgae composition would contain approximately 20 g of microalgae/gal. In the field trials, where the application rate of the microalgae composition is 0.25 gal/acre, the equivalent expressed in total grams of solid microalgae would be 100 g microalgae/acre and where the application rate of the microalgae composition is 1.0 gal/acre, the equivalent expressed in total grams of solid microalgae would be 400 g microalgae/acre.

Overall, as shown in the embodiments and Examples below, the microalgae composition may comprise between approximately 2-20 g of microalgae per gallon, as it is common practice for growers to use between about 100-250 gallons of liquid carrier volume/acre. It should be clearly understood, however, that modifications to the amount of solid microalgae per gallon may be adjusted upwardly to compensate for greater than 250 gallons of liquid carrier volume/acre or adjusted downwardly to compensate for less than 100 gallons of liquid carrier volume/acre.

In some embodiments, stabilizing means that are not active regarding the improvement of plant germination, emergence, maturation, quality, and yield, but instead aid in stabilizing the composition can be added to prevent the proliferation of unwanted microorganisms (e.g., yeast, mold) and prolong shelf life. Such inactive but stabilizing means can include an acid, such as but not limited to phosphoric acid or citric acid, and a yeast and mold inhibitor, such as but not limited to potassium sorbate. In some embodiments, the stabilizing means are suitable for plants and do not inhibit the growth or health of the plant. In the alternative, the stabilizing means can contribute to nutritional properties of the liquid composition, such as but not limited to, the levels of nitrogen, phosphorus, or potassium.

In some embodiments, the composition can include between 0.5-1.5% phosphoric acid. In other embodiments, the composition may comprise less than 0.5% phosphoric acid. In some embodiments, the composition can include 0.01-0.3% phosphoric acid. In some embodiments, the composition can include 0.05-0.25% phosphoric acid. In some embodiments, the composition can include 0.01-0.1% phosphoric acid. In some embodiments, the composition can include 0.1-0.2% phosphoric acid. In some embodiments, the composition can include 0.2-0.3% phosphoric acid. In some embodiments, the composition can include less than 0.3% citric acid.

In some embodiments, the composition can include 1.0-2.0% citric acid. In other embodiments, the composition can include 0.01-0.3% citric acid. In some embodiments, the composition can include 0.05-0.25% citric acid. In some embodiments, the composition can include 0.01-0.1% citric acid. In some embodiments, the composition can include 0.1-0.2% citric acid. In some embodiments, the composition can include 0.2-0.3% citric acid.

In some embodiments, the composition can include less than 0.5% potassium sorbate. In some embodiments, the composition can include 0.01-0.5% potassium sorbate. In some embodiments, the composition can include 0.05-0.4% potassium sorbate. In some embodiments, the composition can include 0.01-0.1% potassium sorbate. In some embodiments, the composition can include 0.1-0.2% potassium sorbate. In some embodiments, the composition can include 0.2-0.3% potassium sorbate. In some embodiments, the composition can include 0.3-0.4% potassium sorbate. In some embodiments, the composition can include 0.4-0.5% potassium sorbate.

The present invention involves the use of one or more microalgae compositions. Microalgae compositions, methods of preparing liquid microalgae compositions, and methods of applying the microalgae compositions to plants are disclosed in WO2017/218896A1 (Shinde et al.) entitled Microalgae-Based Composition, and Methods of its Preparation and Application to Plants and are also disclosed in WO2016/161159A1 (Cizek et al.) entitled System for Vitally Supporting Organisms and Methods of Providing and Using the Same, which are both incorporated herein in full by reference.

In one or more embodiments, the microalgae composition may comprise approximately 10%-10.5% w/w of *Chlorella* microalgae cells. In one or more embodiments, the microalgae composition may also comprise one of more stabilizers, such as potassium sorbate, phosphoric acid, ascorbic acid, sodium benzoate, citric acid, or the like, or any combination thereof. For example, in one or more embodiments, the microalgae composition may comprise approximately 0.3% w/w of potassium sorbate or another similar compound to stabilize its pH and may further comprise approximately 0.5-1.5% w/w phosphoric acid or another similar compound to prevent the growth of contaminants. As a further example, in one or more embodiments where it is desired to use an OMRI (Organic Materials Review Institute) certified organic composition, the microalgae composition may comprise 1.0-2.0% w/w citric acid to stabilize its pH, and may not contain potassium sorbate or phosphoric acid. In one or more embodiments, the pH of the microalgae composition may be stabilized to between 3.0-4.0.

In some embodiments and Examples below, the microalgae composition may be referred to as PhycoTerra® or PHYCOTERRA®. The PHYCOTERRA® *Chlorella* microalgae composition is a microalgae composition comprising *Chlorella*. The PHYCOTERRA® *Chlorella* microalgae composition treatments were prepared by growing the *Chlorella* in non-axenic acetic acid supplied mixotrophic conditions, increasing the concentration of *Chlorella* using a centrifuge, pasteurizing the concentrated *Chlorella* at between 65° C.-75° C. for between 90-150 minutes, adding potassium sorbate and phosphoric acid to stabilize the pH of the *Chlorella*, and then adjusting the whole biomass treatment to the desired concentration. The PHYCOTERRA® *Chlorella* microalgae composition may comprise approximately 10% w/w of *Chlorella* microalgae cells. Furthermore, the PHYCOTERRA® *Chlorella* microalgae composition may comprise between approximately 0.3% potassium sorbate and between approximately 0.5%-1.5% phosphoric acid to stabilize the pH of the *Chlorella* to between 3.0-4.0 and 88.2%-89.2% water. It should be clearly understood, however, that other variations of the PHYCOTERRA® *Chlorella* microalgae composition, including variations in the microalgae strains, microalgae growth or processing methods, variations in the stabilizers, and/or variations in the % composition of each component may be used and may achieve similar results.

In some embodiments and Examples below, the microalgae composition may be an OMRI certified microalgae composition referred to as Terrene® or TERRENE®. The OMRI certified TERRENE® *Chlorella* microalgae composition is a microalgae composition comprising *Chlorella*. The OMRI certified TERRENE® *Chlorella* microalgae composition treatments were prepared by growing the *Chlorella* in non-axenic acetic acid supplied mixotrophic conditions, increasing the concentration of *Chlorella* using a centrifuge, pasteurizing the concentrated *Chlorella* at between 65° C.-75° C. for between 90-150 minutes, adding citric acid to stabilize the pH of the *Chlorella*, and then adjusting the whole biomass treatment to the desired concentration. The OMRI certified TERRENE® *Chlorella* microalgae composition may comprise approximately 10% w/w of *Chlorella* microalgae cells. Furthermore, the OMRI certified TERRENE® *Chlorella* microalgae composition may comprise between approximately 0.5%-2.0% citric acid to stabilize the pH of the *Chlorella* to between 3.0-4.0 and 88%-89.5% water. It should be clearly understood, however, that other variations of the OMRI certified TERRENE® *Chlorella* microalgae composition, including variations in the microalgae strains, microalgae growth or processing methods, variations in the stabilizers, and/or variations in the % composition of each component may be used and may achieve similar results.

In some embodiments and Examples below, the microalgae composition may be an OMRI certified microalgae composition referred to as OMRI certified TERRENE® *Chlorella* pasteurized at 65° C. microalgae composition or as TERRENE65. The OMRI certified TERRENE® *Chlorella* pasteurized at 65° C. microalgae composition is a microalgae composition comprising *Chlorella*. The OMRI certified TERRENE® *Chlorella* pasteurized at 65° C. microalgae composition treatments were prepared by growing the *Chlorella* in non-axenic acetic acid supplied mixotrophic conditions, increasing the concentration of *Chlorella* using a centrifuge, pasteurizing the concentrated *Chlorella* at 65° C. for between 90-150 minutes, adding citric acid to stabilize the pH of the *Chlorella*, and then adjusting the whole biomass treatment to the desired concentration. The OMRI certified TERRENE® *Chlorella* pasteurized at 65° C. microalgae composition may comprise approximately 10% w/w of *Chlorella* microalgae cells. Furthermore, the OMRI certified TERRENE® *Chlorella* pasteurized at 65° C. microalgae composition may comprise between approximately 0.5%-2.0% citric acid to stabilize the pH of the *Chlorella* to between 3.0-4.0 and 88-89.5% water. It should be clearly understood, however, that other variations of the OMRI certified TERRENE® *Chlorella* pasteurized at 65° C. microalgae composition, including variations in the microalgae strains, microalgae growth or processing methods, variations in the stabilizers, variations in the pasteurization temperature, and/or variations in the % composition of each component may be used and may achieve similar results.

In some embodiments and Examples below, the microalgae composition may be an OMRI certified microalgae composition referred to as OMRI certified TERRENE® *Chlorella* pasteurized at 90° C. microalgae composition or as TERRENE90. The OMRI certified TERRENE® *Chlorella* pasteurized at 90° C. microalgae composition is a microalgae composition comprising *Chlorella*. The OMRI certified TERRENE® *Chlorella* pasteurized at 90° C. microalgae composition treatments were prepared by growing the *Chlorella* in non-axenic acetic acid supplied mixotrophic conditions, increasing the concentration of *Chlorella* using a centrifuge, pasteurizing the concentrated *Chlorella* at 90° C. for between 90-150 minutes, adding citric acid to stabilize the pH of the *Chlorella*, and then adjusting the whole biomass treatment to the desired concentration. The OMRI certified TERRENE® *Chlorella* pasteurized at 90° C. microalgae composition may comprise approximately 10% w/w of *Chlorella* microalgae cells. Furthermore, the OMRI certified TERRENE® *Chlorella* pasteurized at 90° C. microalgae composition may comprise between approximately 0.5%-2.0% citric acid to stabilize the pH of the *Chlorella* to between 3.0-4.0 and 88-89.5% water. It should be clearly understood that other variations of the OMRI certified TERRENE® *Chlorella* pasteurized at 90° C. microalgae composition, including variations in the microalgae strains, microalgae growth or processing methods, variations in the stabilizers, variations in the pasteurization temperature, and/or variations in the % composition of each component may be used and may achieve similar results.

In some embodiments and Examples below, the microalgae composition may be referred to as *Aurantiochytrium acetophilum* HS399 whole biomass (WB) or HS399 WB. The *Aurantiochytrium acetophilum* HS399 whole biomass (WB) microalgae composition is a microalgae composition comprising *Aurantiochytrium acetophilum* HS399. The *Aurantiochytrium acetophilum* HS399 whole biomass (WB) microalgae composition treatments were prepared by growing the *Aurantiochytrium acetophilum* HS399 microalgae in non-axenic acetic acid supplied heterotrophic conditions, increasing the concentration of *Aurantiochytrium acetophilum* HS399 using a centrifuge, pasteurizing the concentrated *Aurantiochytrium acetophilum* HS399 at between 65° C.-75° C. for between 90-150 minutes, adding approximately 0.3% w/w of potassium sorbate and between approximately 0.5-1.5% phosphoric acid to stabilize the pH of the *Aurantiochytrium acetophilum* HS399 to between 3.0-4.0, and then adjusting the whole biomass to a desired concentration. It should be clearly understood that other variations of the *Aurantiochytrium acetophilum* HS399 whole biomass (WB) microalgae composition, including variations in the microalgae strains, microalgae growth or processing methods, variations in the stabilizers, variations in the pasteurization temperature, and/or variations in the % composition of each component may be used and may achieve similar results.

In some embodiments and Examples below, the microalgae composition may be referred to as *Aurantiochytrium acetophilum* HS399 washed whole biomass (WB washed). The *Aurantiochytrium acetophilum* HS399 washed whole biomass (WB washed) microalgae composition is a microalgae composition comprising *Aurantiochytrium acetophilum* HS399. The *Aurantiochytrium acetophilum* HS399 washed whole biomass (WB washed) microalgae composition treatments were prepared by growing the *Aurantiochytrium acetophilum* HS399 microalgae in non-axenic acetic acid supplied heterotrophic conditions, increasing the concentration of *Aurantiochytrium acetophilum* HS399 using a centrifuge, pasteurizing the concentrated *Aurantiochytrium acetophilum* HS399 at between 65° C.-75° C. for between 90-150 minutes, adding approximately 0.3% w/w of potassium sorbate and between approximately 0.5%-1.5% phosphoric acid to stabilize the pH of the *Aurantiochytrium acetophilum* HS399 to between 3.0-4.0, and then adjusting the whole biomass to a desired concentration. Once the *Aurantiochytrium acetophilum* HS399 microalgae cells were concentrated from the harvest, they were washed; i.e. diluted with water in a ratio of 5:1 and centrifuged again in order to remove dissolved material and small particles. It should be clearly understood that other variations of the *Aurantiochytrium acetophilum* HS399 washed whole biomass (WB washed) microalgae composition, including variations in the microalgae strains, microalgae growth or processing methods, variations in the stabilizers, variations in the pasteurization temperature, variations in the washing method, and/or variations in the % composition of each component may be used and may achieve similar results.

In some embodiments and Examples below, the microalgae composition may be referred to as a combination 25% *Chlorella*: 75% HS399 whole biomass (WB) microalgae composition or 25% *Chlorella*: 75% HS399 WB. The combination 25% *Chlorella*: 75% HS399 whole biomass (WB) microalgae composition is a microalgae composition comprising *Chlorella* and *Aurantiochytrium acetophilum*

HS399. For the combination 25% *Chlorella:* 75% HS399 whole biomass (WB) microalgae composition, the *Chlorella* microalgae cells were cultured in outdoor pond reactors in non-axenic acetic acid supplied mixotrophic conditions and the concentration of *Chlorella* was increased using a centrifuge. The *Aurantiochytrium acetophilum* HS399 cells were cultured in non-axenic acetic-acid supplied heterotrophic conditions and the concentration of HS399 was increased using a centrifuge. The concentrated *Chlorella* cells were then combined with the concentrated HS399 whole biomass cells and adjusted to the desired concentration of 25% *Chlorella:* 75% HS399 whole biomass (WB). The combination 25% *Chlorella:* 75% HS399 whole biomass (WB) microalgae composition was then pasteurized at between 65° C.-75° C. for between 90-150 minutes and then stabilized by adding approximately 0.3% w/w of potassium sorbate and between approximately 0.5%-1.5% phosphoric acid to stabilize the pH of the 25% *Chlorella:* 75% HS399 whole biomass (WB) microalgae composition to between 3.0-4.0. It should be clearly understood, however, that other variations of the combination 25% *Chlorella:* 75% HS399 whole biomass (WB) microalgae composition, including variations in the microalgae strains, microalgae growth or processing methods, variations in the stabilizers, variations in the order of the processing steps (blending, pasteurizing, stabilizing), and/or variations in the % composition of each component may be used and may achieve similar results.

In some embodiments and Examples below, the microalgae composition may be referred to as a Greenwater Polyculture (GWP) treatment. Greenwater Polyculture may be prepared by beginning with a culture of *Scenedesmus* microalgae that is left outdoors in an open pond and harvested continuously over a year. The culture may comprise anywhere from less than 50% *Scenedesmus* to greater than 75% *Scenedesmus* and the concentration varies throughout the year. Other algae may colonize in the GWP as well as other bacteria and microorganisms.

In some embodiments and Examples below, the microalgae composition may be referred to as HS399 High Oil WB. The HS399 High Oil WB microalgae composition is a microalgae composition comprising *Aurantiochytrium acetophilum* HS399 whole biomass (WB) wherein the *Aurantiochytrium acetophilum* HS399 microalgae cells were grown in non-axenic acetic acid supplied heterotrophic conditions and were harvested late in their growth cycle when the % biomass of the *Aurantiochytrium acetophilum* HS399 microalgae cells is approximately 60% lipid; i.e. after about 70-80 hours. These high lipid/low protein *Aurantiochytrium acetophilum* HS399 whole biomass microalgae cells were then processed by increasing the concentration of the high oil *Aurantiochytrium acetophilum* HS399 whole biomass microalgae cells using a centrifuge, pasteurizing the concentrated high oil *Aurantiochytrium acetophilum* HS399 whole biomass microalgae cells at between 65° C.-75° C. for between 90-150 minutes, adding approximately 0.3% w/w of potassium sorbate and between approximately 0.5-1.5% phosphoric acid to stabilize the pH of the high oil *Aurantiochytrium acetophilum* HS399 whole biomass microalgae cells to between 3.0-4.0, and then adjusting the whole biomass to a desired concentration. It should be clearly understood that other variations of the high oil *Aurantiochytrium acetophilum* HS399 whole biomass (WB) microalgae composition, including variations in the microalgae strains, microalgae growth or processing methods, variations in the stabilizers, variations in the pasteurization temperature, variations in the % lipid biomass, and/or variations in the % composition of each component may be used and may achieve similar results.

In some embodiments, and Examples below, the microalgae composition may be referred to as HS399 High Oil EB. The HS399 High Oil EB microalgae composition is a microalgae composition comprising *Aurantiochytrium acetophilum* HS399 whole biomass (EB) wherein the *Aurantiochytrium acetophilum* HS399 microalgae cells were grown in non-axenic acetic acid supplied heterotrophic conditions and were harvested late in their growth cycle when the % biomass of the *Aurantiochytrium acetophilum* HS399 microalgae cells is approximately 60% lipid; i.e. after about 70-80 hours. These high lipid/low protein *Aurantiochytrium acetophilum* HS399 whole biomass microalgae cells were then processed by increasing the concentration of the high oil *Aurantiochytrium acetophilum* HS399 whole biomass microalgae cells using a centrifuge, pasteurizing the concentrated high oil *Aurantiochytrium acetophilum* HS399 whole biomass microalgae cells at between 65° C.-75° C. for between 90-150 minutes, adding approximately 0.3% w/w of potassium sorbate and between approximately 0.5-1.5% phosphoric acid to stabilize the pH of the high oil *Aurantiochytrium acetophilum* HS399 whole biomass microalgae cells to between 3.0-4.0, lysing the *Aurantiochytrium acetophilum* HS399 whole biomass microalgae cells in water and using a centrifuge to separate oil from the residual biomass resulting in high oil *Aurantiochytrium acetophilum* HS399 extracted biomass (EB) microalgae cells, and then adjusting the extracted/residual biomass to a desired concentration. It should be clearly understood that other variations of the high oil *Aurantiochytrium acetophilum* HS399 extracted biomass (EB) microalgae composition, including variations in the microalgae strains, microalgae growth or processing methods, variations in the stabilizers, variations in the pasteurization temperature, variations in the lysing and extraction steps, variations in the % lipid biomass, and/or variations in the % composition of each component may be used and may achieve similar results.

In some embodiments and Examples below, the microalgae composition may be referred to as HS399 Med Oil WB. The HS399 Medium (Med) Oil WB microalgae composition is a microalgae composition comprising *Aurantiochytrium acetophilum* HS399 whole biomass (WB) wherein the *Aurantiochytrium acetophilum* HS399 microalgae cells were grown in non-axenic acetic acid supplied heterotrophic conditions and were harvested in the middle of their growth cycle when the % biomass of the *Aurantiochytrium acetophilum* HS399 microalgae cells is approximately 45% lipid; i.e. after about 40-50 hours. These medium lipid/medium protein *Aurantiochytrium acetophilum* HS399 whole biomass microalgae cells were then processed by increasing the concentration of the medium oil *Aurantiochytrium acetophilum* HS399 whole biomass microalgae cells using a centrifuge, pasteurizing the concentrated medium oil *Aurantiochytrium acetophilum* HS399 whole biomass microalgae cells at between 65° C.-75° C. for between 90-150 minutes, adding approximately 0.3% w/w of potassium sorbate and between approximately 0.5-1.5% phosphoric acid to stabilize the pH of the medium oil *Aurantiochytrium acetophilum* HS399 whole biomass microalgae cells to between 3.0-4.0, and then adjusting the whole biomass to a desired concentration. It should be clearly understood that other variations of the medium oil *Aurantiochytrium acetophilum* HS399 whole biomass (WB) microalgae composition, including variations in the microalgae strains, microalgae growth or processing methods, variations in the stabilizers, variations in the pasteurization temperature, variations in the % lipid biomass, and/or variations in the % composition of each component may be used and may achieve similar results.

In some embodiments and Examples below, the microalgae composition may be referred to as HS399 Low Oil WB. The HS399 Low Oil WB microalgae composition is a microalgae composition comprising *Aurantiochytrium acetophilum* HS399 whole biomass (WB) wherein the *Aurantiochytrium acetophilum* HS399 microalgae cells were grown in non-axenic acetic acid supplied heterotrophic conditions and were harvested early in their growth cycle when the % biomass of the *Aurantiochytrium acetophilum* HS399 microalgae cells is less than 40% lipid; i.e. after about 20-25 hours. These low oil/high protein *Aurantiochytrium acetophilum* HS399 whole biomass microalgae cells were then processed by increasing the concentration of the low oil *Aurantiochytrium acetophilum* HS399 whole biomass microalgae cells using a centrifuge, pasteurizing the concentrated low oil *Aurantiochytrium acetophilum* HS399 whole biomass microalgae cells at between 65° C.-75° C. for between 90-150 minutes, adding approximately 0.3% w/w of potassium sorbate and between approximately 0.5%-1.5% phosphoric acid to stabilize the pH of the low oil *Aurantiochytrium acetophilum* HS399 whole biomass microalgae cells to between 3.0-4.0, and then adjusting the whole biomass to a desired concentration. It should be clearly understood that other variations of the low oil *Aurantiochytrium acetophilum* HS399 whole biomass (WB) microalgae composition, including variations in the microalgae strains, microalgae growth or processing methods, variations in the stabilizers, variations in the pasteurization temperature, variations in the % lipid biomass, and/or variations in the % composition of each component may be used and may achieve similar results.

In some embodiments and Examples below, the microalgae composition may be referred to as *Galdieria*. The *Galdieria* microalgae composition is a microalgae composition comprising *Galdieria purpurea* cells. The *Galdieria* microalgae composition treatments were prepared by growing the *Galdieria purpurea* cells in axenic mixotrophic conditions with glycerol, increasing the concentration of *Galdieria purpurea* cells using a centrifuge, pasteurizing the concentrated *Galdieria purpurea* cells at between 65° C.-75° C. for between 90-150 minutes, adding potassium sorbate and phosphoric acid to stabilize the pH of the *Galdieria purpurea* cells, and then adjusting the whole biomass treatment to the desired concentration. The *Galdieria* microalgae composition may comprise approximately 10% w/w of *Galdieria purpurea* microalgae cells. Furthermore, the *Galdieria* microalgae composition may comprise between approximately 0.3% potassium sorbate and between approximately 0.5%-1.5% phosphoric acid to stabilize the pH of the *Galdieria purpurea* cells to between 3.0-4.0, and then adjusting the whole biomass to a desired concentration. It should be clearly understood, however, that other variations of the *Galdieria* microalgae composition, including variations in the microalgae strains, microalgae growth or processing methods, variations in the stabilizers, and/or variations in the % composition of each component may be used and may achieve similar results.

In some embodiments and Examples below, the microalgae composition may be referred to as *Haematococcus* Mixotrophic. The *Haematococcus* Mixotrophic microalgae composition is a microalgae composition comprising *Haematococcus* microalgae cells. The *Haematococcus* Mixotrophic microalgae composition treatments were prepared by growing the *Haematococcus* cells in axenic acetic acid-supplied mixotrophic conditions, increasing the concentration of *Haematococcus* cells using a centrifuge, pasteurizing the concentrated *Haematococcus* cells at between 65° C.-75° C. for between 90-150 minutes, adding approximately 0.3% w/w or potassium sorbate and between approximately 0.5%-1.5% phosphoric acid to stabilize the pH of the *Haematococcus* cells to between 3.0-4.0, and then adjusting the whole biomass treatment to the desired concentration. The *Haematococcus* Mixotrophic microalgae composition may comprise approximately 10% w/w of *Haematococcus* microalgae cells. Furthermore, the *Haematococcus* Mixotrophic microalgae composition may comprise between approximately 0.3% potassium sorbate and between approximately 0.5%-1.5% phosphoric acid to stabilize the pH of the *Haematococcus* cells to between 3.0-4.0, and then adjusting the whole biomass to a desired concentration. It should be clearly understood, however, that other variations of the *Haematococcus* Mixotrophic microalgae composition, including variations in the microalgae strains, microalgae growth or processing methods, variations in the stabilizers, and/or variations in the % composition of each component may be used and may achieve similar results.

In some embodiments and Examples below, the microalgae composition may be referred to as *Haematococcus* Phototrophic. The *Haematococcus* Phototrophic microalgae composition is a microalgae composition comprising *Haematococcus* microalgae cells. The *Haematococcus* Phototrophic microalgae composition treatments were prepared by growing the *Haematococcus* cells in either axenic or non-axenic phototrophic conditions supplied with sunlight and $CO_2$, increasing the concentration of *Haematococcus* cells using a centrifuge, pasteurizing the concentrated *Haematococcus* cells at between 65° C.-75° C. for between 90-150 minutes, adding approximately 0.3% w/w or potassium sorbate and between approximately 0.5%-1.5% phosphoric acid to stabilize the pH of the *Haematococcus* cells to between 3.0-4.0, and then adjusting the whole biomass treatment to the desired concentration. The *Haematococcus* Phototrophic microalgae composition may comprise approximately 10% w/w of *Haematococcus* microalgae cells. Furthermore, the *Haematococcus* Phototrophic microalgae composition may comprise between approximately 0.3% potassium sorbate and between approximately 0.5%-1.5% phosphoric acid to stabilize the pH of the *Haematococcus* cells to between 3.0-4.0, and then adjusting the whole biomass to a desired concentration. It should be clearly understood, however, that other variations of the *Haematococcus* Phototrophic microalgae composition, including variations in the microalgae strains, microalgae growth or processing methods, variations in the stabilizers, and/or variations in the % composition of each component may be used and may achieve similar results.

In some embodiments and Examples below, the microalgae composition may be referred to as *Haematococcus* Phototrophic EB. The *Haematococcus* Phototrophic Extracted Biomass (EB) microalgae composition is a microalgae composition comprising *Haematococcus* microalgae cells. The *Haematococcus* Phototrophic EB microalgae composition treatments were prepared by growing the *Haematococcus* cells in either axenic or non-axenic phototrophic conditions supplied with sunlight and $CO_2$, increasing the concentration of *Haematococcus* cells using a centrifuge, pasteurizing the concentrated *Haematococcus* cells at between 65° C.-75° C. for between 90-150 minutes, adding approximately 0.3% w/w of potassium sorbate and between approximately 0.5%-1.5% phosphoric acid to stabilize the pH of the *Haematococcus* cells to between 3.0-4.0, processing the *Haematococcus* cells with an oat filler in an expeller process to lyse the cells and separate oil from the residual biomass, and then adjusting the residual biomass to a desired concentration. The *Haematococcus* Phototrophic EB microalgae composition may comprise approximately 10% w/w of extracted *Haematococcus* microalgae cells. Furthermore, the *Haematococcus* Phototrophic microalgae composition may comprise between approximately 0.3% potassium sorbate and between approximately 0.5%-1.5% phosphoric acid to stabilize the pH of the *Haematococcus* cells to between 3.0-4.0, and then adjusting the biomass to a desired concentration. It should be clearly understood, however, that other variations of the *Haematococcus* Phototrophic EB microalgae composition, including variations in the microalgae strains, microalgae growth or processing methods, variations in the stabilizers, and/or variations in the % composition of each component may be used and may achieve similar results.

In some embodiments and Examples below, the microalgae composition may be referred to as *Spirulina*. The *Spirulina* microalgae composition is a microalgae composition comprising *Spirulina* microalgae cells. The *Spirulina* microalgae composition treatments were prepared by growing the *Spirulina* cells in non-axenic phototrophic conditions supplied with sunlight, bicarbonate and $CO_2$, increasing the concentration of *Spirulina* cells using a circular vibratory screener (rather than using a centrifuge due to *Spirulina* being a different size and shape than most microalgae), pasteurizing the concentrated *Spirulina* cells at between 65° C.-75° C. for between 90-150 minutes, adding approximately 0.3% w/w or potassium sorbate and between approximately 0.5%-1.5% phosphoric acid to stabilize the pH of the *Spirulina* cells to between 3.0-4.0, and then adjusting the whole biomass treatment to the desired concentration. Once the *Spirulina* microalgae cells were concentrated to greater than 10% solids, the *Spirulina* was harvested using the vibratory screener, they were then washed on the same vibratory screener (i.e. diluted with water in a ratio of 5:1), and the *Spirulina* was then sheared to reduce the size and prevent clumping (*Spirulina* at 10% solids typically forms a thick gel, whereas sheared *Spirulina* at 10% has more of a thinner soup-like consistency). If the concentration was above 10%, the *Spirulina* was then diluted again so that the *Spirulina* microalgae composition comprised approximately 10% w/w of *Spirulina* microalgae cells. Furthermore, the *Spirulina* microalgae composition may comprise between approximately 0.3% potassium sorbate and between approximately 0.5%-1.5% phosphoric acid to stabilize the pH of the *Spirulina* cells to between 3.0-4.0, and then adjusting the biomass to a desired concentration. It should be clearly understood, however, that other variations of the *Spirulina* microalgae composition, including variations in the microalgae strains, microalgae growth or processing methods, variations in the stabilizers, and/or variations in the % composition of each component may be used and may achieve similar results.

In some embodiments and Examples below, the microalgae composition may be referred to as *Isochrysis*. The *Isochrysis* microalgae composition is a microalgae composition comprising *Isochrysis* (specifically *Tisochrysis*) microalgae cells. The *Isochrysis* microalgae composition treatments were prepared by growing the *Isochrysis* cells in non-axenic phototrophic conditions supplied with sunlight and $CO_2$, allowing the culture to experience nitrogen depletion to increase lipid production (i.e. running the culture to a point of no measurable nitrate and allowing it to remain in a high-light situation while still providing the $CO_2$ so that the carbon will produce more lipids as a stress response), increasing the concentration of *Isochrysis* cells using a centrifuge, pasteurizing the concentrated *Isochrysis* cells at between 65° C.-75° C. for between 90-150 minutes, adding approximately 0.3% w/w or potassium sorbate and between approximately 0.5%-1.5% phosphoric acid to stabilize the pH of the *Isochrysis* cells to between 3.0-4.0, and then adjusting the whole biomass treatment to the desired concentration. The *Isochrysis* microalgae composition may comprise approximately 6.2% w/w of *Isochrysis* microalgae cells. Furthermore, the *Isochrysis* microalgae composition may comprise between approximately 0.3% potassium sorbate and between approximately 0.5%-1.5% phosphoric acid to stabilize the pH of the *Haematococcus* cells to between 3.0-4.0, and then adjusting the whole biomass to a desired concentration. It should be clearly understood, however, that other variations of the *Isochrysis* microalgae composition, including variations in the microalgae strains, microalgae growth or processing methods, variations in the stabilizers, and/or variations in the % composition of each component may be used and may achieve similar results.

In some embodiments, the composition is a liquid and substantially includes water. In some embodiments, the composition can include 70-99% water. In some embodiments, the composition can include 85-95% water. In some embodiments, the composition can include 70-75% water. In some embodiments, the composition can include 75-80% water. In some embodiments, the composition can include 80-85% water. In some embodiments, the composition can include 85-90% water. In some embodiments, the composition can include 90-95% water. In some embodiments, the composition can include 95-99% water. The liquid nature and high-water content of the composition facilitates administration of the composition in a variety of manners, such as but not limit to: flowing through an irrigation system, flowing through an above ground drip irrigation system, flowing through a buried drip irrigation system, flowing through a central pivot irrigation system, sprayers, sprinklers, and water cans.

In some embodiments, the liquid composition can be used immediately after formulation, or can be stored in containers for later use. In some embodiments, the composition can be stored out of direct sunlight. In some embodiments, the composition can be refrigerated. In some embodiments, the composition can be stored at 1-10° C. In some embodiments, the composition can be stored at 1-3° C. In some embodiments, the composition can be stored at 3-50° C. In some embodiments, the composition can be stored at 5-8° C. In some embodiments, the composition can be stored at 8-10° C.

In some embodiments, administration of the liquid composition to soil, a seed, seedling, or plant can be in an amount effective to produce an enhanced characteristic in plants and fruits compared to a substantially identical population of plants and fruits growing from untreated soil, seeds, seedlings, or plants. Such enhanced characteristics can include increased plant health and increased resistance to fungal pathogens in the plant and fruit. Such enhanced characteristics can occur individually in a plant, or in combinations of multiple enhanced characteristics.

In some embodiments, a liquid composition can be administered before the seed is planted. In some embodiments, a liquid composition can be administered at the time the seed is planted. In some embodiments, a liquid composition can be administered to plants that have emerged from the ground. In some embodiments, a liquid composition can be administered to plants at the time of transplant. In some embodiments, a liquid composition can be applied to the soil by drip or drench applications before, during, or after the planting of a seed. In some embodiments a liquid composition can be applied to the soil before or after a plant emerges from the soil.

In some embodiments, the volume or mass of the microalgae based composition applied to a seed, seedling, plant or soil may not increase or decrease during the growth cycle of the plant (i.e., the amount of the microalgae composition applied to the plant or soil will not change as the plant grows larger). In some embodiments, the volume or mass of the microalgae based composition applied to a seed, seedling, plant or soil can increase during the growth cycle of the plant (i.e., applied on a mass or volume per plant mass basis to provide more of the microalgae composition as the plant grows larger). In some embodiments, the volume or mass of the microalgae based composition applied to a seed, seedling, plant, or soil can decrease during the growth cycle of the plant (i.e., applied on a mass or volume per plant mass basis to provide more of the microalgae composition as the plant grows larger).

In some embodiments, the rate of application of the liquid composition in a soil application can comprise a rate in the range of 0.25-1.0 gal/acre. In some embodiments, the rate can be 0.25-0.5 gal/acre.

In some embodiments, the concentration of the liquid composition in soil or foliar applications comprised a concentration in the range of 0.1 ml/L-2.5 ml/L. In some embodiments, the concentration ranged between 0.1 ml/L-1.0 ml/L. In some embodiments, the concentration ranged between 1.0 ml/L-2.5 ml/L.

In some embodiments, the v/v ratio of the composition can be between 1-5%. In other embodiments, the v/v ratio of the composition can be between 1-4%. In other embodiments, the v/v ratio of the composition can be between 0.5-5.0%.

The frequency of the application of the composition can be expressed as the number of applications per period of time (e.g., two applications per month), or by the period of time between applications (e.g., one application every 14 days). In some embodiments, the plant can be contacted by the composition in a foliar application every 3-28 days. In some embodiments, the plant can be contacted by the composition in a foliar application every 4-10 days. In some embodiments, the plant can be contacted by the composition in a foliar application every 18-24 days. In some embodiments, the plant can be contacted by the composition in a foliar application every 3-7 days. In some embodiments, the plant can be contacted by the composition in a foliar application every 7-14 days. In some embodiments, the plant can be contacted by the composition in a foliar application every 14-21 days. In some embodiments, the plant can be contacted by the composition in a foliar application every 21-28 days. In some embodiments, the soil or plant can be treated with the composition once per planting. In some embodiments, the soil or plant can be treated with the composition one time every cutting/harvest.

Foliar application(s) of the composition generally begin after the plant has become established, but can begin before establishment, at defined time period after planting, or at a defined time period after emergence form the soil in some embodiments. In some embodiments, the plant can be first contacted by the composition in a foliar application 5-14 days after the plant emerges from the soil. In some embodiments, the plant can be first contacted by the composition in a foliar application 5-7 days after the plant emerges from the soil. In some embodiments, the plant can be first contacted by the composition in a foliar application 7-10 days after the plant emerges from the soil. In some embodiments, the plant can be first contacted by the composition in a foliar application 10-12 days after the plant emerges from the soil. In some embodiments, the plant can be first contacted by the composition in a foliar application 12-14 days after the plant emerges from the soil. In some of the Examples below, the plants were 21 days old when they received a foliar application of the microalgae composition.

In another non-limiting embodiment, the administration of the composition can include contacting the soil in the immediate vicinity of the planted seed with an effective amount of the composition. In some embodiments, the liquid composition can be supplied to the soil by injection into a low volume irrigation system, such as but not limited to a drip irrigation system supplying water beneath the soil through perforated conduits or at the soil level by fluid conduits hanging above the ground or protruding from the ground. In some embodiments, the liquid composition can be supplied to the soil by a soil drench method wherein the liquid composition is poured on the soil.

The composition can be diluted to a lower concentration for an effective amount in a soil application by mixing a volume of the composition in a volume of water. The percent solids of microalgae sourced components resulting in the diluted composition can be calculated by the multiplying the original concentration in the composition by the ratio of the volume of the composition to the volume of water. Alternatively, the grams of microalgae sourced components in the diluted composition can be calculated by the multiplying the original grams of microalgae sourced components per 100 mL by the ratio of the volume of the composition to the volume of water.

Prior patent applications containing useful background information and technical details are PCT/US2017/053432 titled METHODS OF CULTURING AURANTIOCHYTRIUM USING ACETATE AS AN ORGANIC CARBON SOURCE, filed on Sep. 26, 2017; PCT/US2017/037878 and PCT/2017/037880, both applications titled MICROALGAE-BASED COMPOSITION, AND METHODS OF ITS PREPARATION AND APPLICATION TO PLANTS, both filed on Jun. 16, 2017; PCT/US2016/025343 titled SYSTEM FOR VITALLY SUPPORTING ORGANISMS AND METHODS OF PROVIDING AND USING THE SAME, filed on Mar. 31, 2016; and PCT/US2015/066160, titled MIXOTROPHIC *CHLORELLA*-BASED COMPOSITION, AND METHODS OF ITS PREPARATION AND APPLICATION TO PLANTS, filed on Dec. 15, 2015. Each of these applications is incorporated herein by reference in its entirety.

It will be understood that various modifications may be made to the embodiments disclosed herein. Therefore, the above description should not be construed as limiting, but merely as exemplifications of preferred embodiments. Those skilled in the art will envision other modifications within the scope and spirit of the claims appended hereto. All patents and references cited herein are explicitly incorporated by reference in their entirety.

EXAMPLES

Indirect Effect—Application of Microalgae Composition to Soil

Examples 1-10 below summarize several experiments wherein the microalgae composition is applied to the soil, rather than applied directly to the plant infected with a fungal pathogen. The Examples 1-10, the microalgae composition is applied to the soil within the immediate vicinity of the seed, seedling, or plant. Such application to the soil causes an indirect effect on the incidence of the fungal pathogen infecting the plant.

Example 1

A trial was conducted on strawberry (var. *Portola*) in Guadalupe Valley, Calif. to evaluate the performance the PHYCOTERRA® *Chlorella* microalgae composition, the *Aurantiochytrium acetophilum* HS399 whole biomass (WB) microalgae composition, the *Aurantiochytrium acetophilum* HS399 washed whole biomass (WB washed) microalgae composition, the OMRI certified TERRENE® *Chlorella* pasteurized at 90° C. microalgae composition, and the combination 25% *Chlorella*: 75% HS399 whole biomass (WB) microalgae composition of strawberry growth, yield, post-harvest berry quality, and incidence of diseased/dying plants. All plots received standard local fertilization regimen used by the grower for this crop, excluding biostimulants. Our products were added in addition to standard fertilization. Strawberry plants were transplanted to the field in early June 2017, according to local commercial practice. The first product application was via drip irrigation at the time of transplanting and then every 14 days afterward until harvest. The untreated control received the same amount of carrier water as other treatments at the time of each product application. The microalgae compositions were shaken well before application and agitated, if possible, while in the chemigation tank in order to prevent solids from settling. Berries were harvested according to local commercial schedule. This experiment was conducted on high pH (8.0), 0.3-0.6% OM (organic matter), Loamy Sand soil. All plots were managed according to the local standard practice (see Study Parameters below).

| STUDY PARAMETERS | |
|---|---|
| Crop | Strawberry (var. Portola) |
| Location | Guadalupe Valley, CA |
| Conventional Row Spacing | 40" furrow spacing with 24" wide bed spacing, and plants on plant lines 12" apart and plant lines 12" apart |
| Harvest Schedule | As frequently as standard local grower practice with estimated 12-16 picks |
| Fumigation Schedule | Early May, 32 gal/a PicChlor60 |
| Plot size minimum | 1 double-line bed 45 ft length per plot with 80+ plants per plot |
| Trial Design | Randomized Complete Block |
| Observations | Taken from 70 plants inside 3 ft buffer zone of each plot end |
| Replication | 6 replicate plots for each treatment |
| Local Standard Production | Fertility, weed, insect management, etc. |
| Standard Management Practice | Fungicide application. Record disease management measures Fungicides will be applied weekly when flowers and fruit are present |

Application rates of the PHYCOTERRA® *Chlorella* microalgae composition, the *Aurantiochytrium acetophilum* HS399 whole biomass (WB) microalgae composition, the *Aurantiochytrium acetophilum* HS399 washed whole biomass (WB washed) microalgae composition, the OMRI certified TERRENE® *Chlorella* pasteurized at 90° C. microalgae composition, and the combination 25% OMRI certified TERRENE® *Chlorella* pasteurized at 90° C.: 75% HS399 whole biomass (WB) microalgae composition were as detailed in Table 1 below. Raw data is shown in Table 2 below.

TABLE 1

Treatments

| Treatment Number | Product | Application Rate gallon/acre |
|---|---|---|
| T1 | Untreated control (UTC/standard practice) | N/A |
| T2 | Seaweed Commercial Reference | 0.5 |
| T3 | PhycoTerra ® | 0.25 |
| T4 | PhycoTerra ® | 0.5 |
| T5 | HS399 Whole Biomass (WB) washed | 0.25 |
| T6 | HS399 Whole Biomass (WB) washed | 0.5 |
| T7 | HS399 Whole Biomass (WB) | 0.25 |
| T8 | HS399 Whole Biomass (WB) | 0.5 |
| T9 | Terrene ® pasteurized at 90 C. | 0.25 |
| T10 | Terrene ® pasteurized at 90 C. | 0.5 |
| T11 | 25% Terrene ® pasteurized at 90 C.: 75% HS399 WB | 0.25 |
| T12 | 25% Terrene ® pasteurized at 90 C.: 75% HS399 WB | 0.5 |

TABLE 2

Raw Data

| Treatment and rate (gallon/A) | Application Rate gallon/acre | Botrytis % severity 18 days after harvest | % change from UTC |
|---|---|---|---|
| Untreated control (UTC/standard practice) | N/A | 88.92 | |
| Seaweed Commercial Reference | 0.5 | 83.33 | −6 |
| PhycoTerra ® | 0.25 | 83.58 | −6 |
| PhycoTerra ® | 0.5 | 84.67 | −5 |
| HS399 Whole Biomass (WB) washed | 0.25 | 83.00 | −7 |
| HS399 Whole Biomass (WB) washed | 0.5 | 91.08 | 2 |
| HS399 Whole Biomass (WB) | 0.25 | 90.33 | 2 |
| HS399 Whole Biomass (WB) | 0.5 | 85.67 | −4 |
| Terrene ® pasteurized at 90 C. | 0.25 | 80.25 | −10 |
| Terrene ® pasteurized at 90 C. | 0.5 | 86.75 | −2 |
| 25% Terrene ® pasteurized at 90 C.: 75% HS399 WB | 0.25 | 85.08 | −4 |
| 25% Terrene ® pasteurized at 90 C.: 75% HS399 WB | 0.5 | 75.08 | −16 |

As shown in FIG. 1, a reduced incidence of *Botrytis* was observed. At 15 and 24 weeks after transplanting, berries were harvested and stored in cold storage for up to 12 days or up to 18 days. Only the 24-week harvest was stored up to 18 days. Ratings were taken 7, 9 and 12 days after the week 15 harvest and 12, 14, and 18 days after the 24-week harvest, for *Botrytis, Rhizopus* and Leather Rot (*Phytophthora*). For the week 15 harvest there was no advantage observed for any treatment, however the berries were stored longer for the week 24 harvest and differences were observed. The 0.5 gal/acre combination of TERRENE® *Chlorella* pasteurized at 90° C. microalgae composition treatment (25%) and HS399 WB (75%) resulted in a 16% reduction in incidence of *Botrytis* 18 days after storage for the week 24 harvest compared to standard practice. On their own, these products also reduced *Botrytis* but not to as high a degree (7 and 10%). Reductions in the incidence of *Botrytis* were also seen in the plants treated with both 0.25 and 0.5 gal/acre PHY- COTERRA® *Chlorella* microalgae compositions (5-6% reduction); the 0.5 gal/acre *Aurantiochytrium acetophilum* HS399 whole biomass (WB) microalgae composition (4% reduction); and the 0.25 gal/acre *Aurantiochytrium acetophilum* HS399 washed whole biomass (WB washed) microalgae composition (7% reduction). No reductions were observed for the other fungi assessed in this trial.

Example 2

For the treatments referred to in this Example as Commercial Reference+TERRENE® pasteurized at 65° C., the commercial reference was applied first to the soil at a rate of 20 gal/acre. The TERRENE® pasteurized at 65° C. microalgae composition was then added on top via drip irrigation. The commercial reference was only applied 4 times per season, whereas the TERRENE® pasteurized at 65° C. microalgae composition was applied every 14 days until harvest.

For the treatments referred to in this Example as Commercial Reference+TERRENE® pasteurized at 90° C., the commercial reference was applied first to the soil at a rate of 20 gal/acre. The TERRENE® pasteurized at 90° C. microalgae composition was then added on top via drip irrigation. The commercial reference was only applied 4 times per season, whereas the TERRENE® pasteurized at 90° C. microalgae composition was applied every 14 days until harvest.

A trial was conducted on strawberry (var. *Portola*—Organic) in Santa Maria, Calif. to evaluate performance of various OMRI certified microalgae compositions on organic strawberry growth, yield, post-harvest berry quality, and incidence of diseased/dying plants; particularly, the OMRI certified TERRENE® *Chlorella* pasteurized at 65° C. microalgae composition, the OMRI certified TERRENE® *Chlorella* pasteurized at 90° C. microalgae composition, the combination OMRI certified TERRENE® pasteurized at 65° C.: microbial-based commercial reference microalgae composition, and the combination OMRI certified TERRENE® pasteurized at 90° C.: microbial-based commercial reference microalgae composition. All plots received standard local fertigation practice, including NEPTUNE'S HARVEST fertilizer and NFORCE fertilizer. A control was added with standard local fertigation practice plus 4 applications of a microbial-based commercial reference product that is standard to this location. Treatments included two versions of an OMRI certified *Chlorella* microalgae composition that differ by pasteurization temperature (the OMRI certified TERRENE® *Chlorella* pasteurized at 65° C. microalgae composition and the OMRI certified TERRENE® *Chlorella* pasteurized at 90° C. microalgae composition), each tested alone and each tested in combination with the microbial-based commercial reference. Strawberry plants (frigo) were transplanted to the field in June 2017, according to local commercial practice. The first product application was via drip irrigation at the time of transplanting and then every 14 days afterward through to final harvest. The untreated control received the same amount of carrier water as other treatments at the time of each product application. The microalgae compositions were shaken well before application and agitated while in the chemigation tank in order to prevent solids from settling. Berries were harvested according to local commercial schedule (twice per week during fruiting season). The timing of the commercial reference applications were once at the time of planting (6/20), once 14-21 days after planting (7/5), once in late July/early August (7/31) and the last in early September (9/11). All plots were managed according to the local standard practice (see Study Parameters below).

| STUDY PARAMETERS | |
|---|---|
| Crop | Strawberry (var. Portola) |
| Location | Santa Maria, CA |
| Conventional Row Spacing | Wide 4-row beds, 64-inches center-to-center; plants spaced 14 inches apart in each of the four rows |
| Harvest Schedule | As frequently as standard local grower practice with estimated 32 picks |
| Fumigation Schedule | None (Organic) |
| Plot size minimum | 1 four-row bed 25-30 ft length per plot with 80+ plants per plot. Plots will be located away from any field edges with 1-2 commercial buffer beds in between |
| Trial Design | Randomized complete block |
| Observations | Yield data taken from 40 inside plants, outside 40 combined with inside 40 for post-harvest assessments |
| Replication | 6 replicate plots for each treatment and untreated control |
| Local Standard Production | Fertility, weed, insect management, etc. |
| Standard Management Practice | Standard management practices for organic production. Record disease management measures |

Application rates of the OMRI certified TERRENE® *Chlorella* pasteurized at 65° C. microalgae composition treatment, the OMRI certified TERRENE® *Chlorella* pasteurized at 90° C. microalgae composition treatment, the combination Commercial Reference+OMRI certified TERRENE® *Chlorella* pasteurized at 65° C. microalgae composition treatment, and the combination Commercial Reference+OMRI certified TERRENE® *Chlorella* pasteurized at 90° C. microalgae composition treatment were as detailed in Table 3 below. Raw data is included in the tables shown in Tables 4-5 below.

TABLE 3

Treatments

| Treatment Number | Product | Application Rate gallon/acre |
|---|---|---|
| T1 | Standard practice only (UTC) | Water |
| T2 | Commercial reference (No TERRENE ®) | 20 |
| T3 | Commercial reference + TERRENE ® pasteurized at 65° C. | 0.5 |
| T4 | Commercial reference + TERRENE ® pasteurized at 90° C. | 0.5 |
| T5 | TERRENE ® pasteurized at 65° C. | 0.25 |
| T6 | TERRENE ® pasteurized at 90° C. | 0.25 |
| T7 | TERRENE ® pasteurized at 65° C. | 0.5 |
| T8 | TERRENE ® pasteurized at 90° C. | 0.5 |

TABLE 4

Raw Data for Number of Diseased Plants Per Plot

Assessment date (No. diseased plants per plot)

| Treatment | 29-Aug | % change over control | 26-Sep | % change over control | 23-Oct | % change over control |
|---|---|---|---|---|---|---|
| Standard practice | 0.17 | | 2.5 | | 3.5 | |
| Comm. Ref. | 0.50 | 200% | 3.7 | 47% | 3.5 | 0% |
| Comm. Ref + TERRENE ®65 | 0.17 | 0% | 3.5 | 40% | 4.5 | 29% |
| Comm. Ref + TERRENE ®90 | 0.17 | 0% | 3.5 | 40% | 3.8 | 10% |
| TERRENE ®65_0.25 gal/A | 0.50 | 200% | 2.8 | 13% | 3.0 | −14% |
| TERRENE ®90_0.25 gal/A | 0.33 | 100% | 3.2 | 27% | 3.7 | 5% |
| TERRENE ®65_0.5 gal/A | 0.83 | 400% | 2.2 | −13% | 3.3 | −5% |
| TERRENE ®90_0.5 gal/A | 0.17 | 0% | 2.5 | 0% | 3.0 | −14% |

A reduced incidence of plant disease and berry rot was observed. *Macrophomina* (charcoal rot) was noted as impacting many strawberry fields in the region of this trial. The trial was ended early due to the entire ranch being infested with the disease and loss of productivity. The number of diseased plants was quantified for each treatment plot on several occasions and was highest for standard practice on the final assessment date (Oct. 23, 2017), 12 weeks after planting. On this date, plots receiving TERRENE® *Chlorella* pasteurized at 65° C. microalgae composition treatment at ¼ to ½ gal/A and TERRENE® *Chlorella* pasteurized at 90° C. microalgae composition treatment at ½ gal/A had 5-14% fewer diseased plants.

TABLE 5

Raw Data for Proportion of Rotten Fruit

Post-storage assessment date (Proportion of rotten fruit)

| Treatment | Sep. 6, 2017 | % change over control | Oct. 4, 2017 | % change over control | Nov. 6, 2017 | % change over control |
|---|---|---|---|---|---|---|
| Standard practice | 0.45 | | 0.031 | | 0.25 | |
| Comm. Ref. | 0.48 | 7% | 0.084 | 170% | 0.18 | −30% |
| Comm. Ref + TERRENE ®65 | 0.41 | −9% | 0.022 | −27% | 0.10 | −59% |
| Comm. Ref + TERRENE ®90 | 0.62 | 37% | 0.067 | 116% | 0.17 | −34% |
| TERRENE ®65_0.25 gal/A | 0.45 | −1% | 0.033 | 5% | 0.21 | −16% |
| TERRENE ®90_0.25 gal/A | 0.55 | 22% | 0.020 | −36% | 0.15 | −39% |
| TERRENE ®65_0.5 gal/A | 0.52 | 16% | 0.024 | −21% | 0.14 | −43% |
| TERRENE ®90_0.5 gal/A | 0.39 | −13% | 0.015 | −50% | 0.18 | −29% |

On 3 occasions, berries were harvested and stored at 34 F for 6 days and then assessed for degree of rot (podridas) on the berries. Across all three dates, the combination of the microbial-based commercial reference and TERRENE® *Chlorella* pasteurized at 65° C. microalgae composition treatment at ½ gal/A (9-59%) and TERRENE® *Chlorella* pasteurized at 90° C. microalgae composition treatment at ½ gal/A alone (13-50%) had consistent advantage over standard practice. For the final assessment, all treatments had an advantage over standard practice.

Example 3

A trial was conducted on green bean plants in a greenhouse in Phelps, N.Y. to evaluate the applications of several microalgae compositions on the growth and yield of green bean plants in the greenhouse. Twelve microalgae compositions were evaluated in this Example; they are detailed in Table 6 below. The twelve microalgae compositions were evaluated at 1% and 4% solutions and each microalgae treatment combination was evaluated against green bean seedlings: a) alone; b) with a low rate of *Rhizoctonia*; and C) with a high rate of *Rhizoctonia solani*. Thus, with each formulation, there were 3 main effects and 15 replicates, or 45 pots per formulation rate. Pots of green beans seedlings were additionally grown with no formulations, and with no formulations, but with the LOW and HIGH rates of *Rhizoctonia*; these seedlings served as non-treated controls.

TABLE 6

Microalgae Composition Treatments

| Treatment | Description (10% solids solution) |
|---|---|
| PhycoTerra ® | *Chlorella*-based product |
| HS399 High Oil EB | Extracted biomass from HS399 harvested at high oil content |
| HS399 High Oil WB | Whole biomass from HS399 harvested at high oil content |
| HS399 Med Oil WB | Whole biomass from HS399 harvested at medium oil content |
| HS399 Low Oil WB | Whole biomass from HS399 harvested at low oil content |
| *Galdieria* | *Galdieria purpurea* |
| GWP (*Scendedesmus*) | Green water polyculture |
| *Haematococcus* mixotrophic | Whole biomass from *Haematococcus* grown using mixotrophic conditions |
| *Haematococcus* phototrophic | Whole biomass from *Haematococcus* grown using phototrophic conditions |
| *Haematococcus* phototrophic EB | Whole biomass from *Haematococcus* grown using phototrophic conditions |
| *Isochrysis* | *Isochrysis* sp. (T-*isochrysis*) |
| *Spirulina* | *Spirulina* sp. |

Green bean seeds were planted into FARARD® BX potting media into 4-inch round pots. Green bean seeds, variety "Provider", were planted into each pot (one seed per pot). *Rhizoctonia* cultures from Potato Dextrose Agar (PDA) plates were used for inoculating the pots within this assay. Fourteen day old PDA plates were used to inoculate plots. For the LOW rate of *Rhizoctonia*, petri dishes were flooded with water, and the surface of the agar petri dish was "rubbed vigorously" using a rubber policeman. The rubbing dislodged the mycelium as well as the microsclerotia, which are highly effective at infecting roots. The resultant solution was collected in a large beaker. Each plate was flooded and rubbed three times. The resultant suspension was divided into two large laboratory beakers. One beaker was used directly for the LOW *Rhizoctonia* inoculations, and the other was used for the HIGH inoculations, which was amended with the remaining agar and mycelium. In order to amend the HIGH rate of *Rhizoctonia*, the PDA plates were macerated within a commercial laboratory blender, thus all the mycelium, plus any remaining microsclerotia were captured. This macerated solution was added to the second beaker of the fungal suspension (as described above). For the LOW inoculation, 1 ml of the "LOW" solution was added to pots that were to receive the 1 & 4% solutions of the microalgae formulations; thus, 15 reps×12 formulations, × the 2 trt (1&4%) and using 1 ml of inoculation suspension per pot=360 mls of suspension needed for the LOW inoculations. For the HIGH inoculation, 3 mls of final suspension was used per pot, thus 15 reps×12 formulations, ×(1&4%) solutions required 1080 mls of inoculation suspension.

For inoculations, the pots, were seeded just prior to the second application of the microalgae formulations. A "pencil" was poked down into the pot next to the roots of the young seedling, and 1 ml of the LOW suspension was pipetted into the soil media. For the HIGH inoculation, the fungal suspension was added to 3 holes poked into the media near the seed. The control pots, which had no *Rhizoctonia* added, were maintained grouped on benches in half of the greenhouse; whereas the *Rhizoctonia* treated pots were maintained on benches on the other side of the greenhouse. Additionally, the LOW and HIGH levels of inoculum were also separated to avoid cross-contamination.

All plots were managed according to the Study Parameters below.

STUDY PARAMETERS

| | |
|---|---|
| Crop | Green Beans variety "Provider", |
| Location | Phelps, NY |
| Potting Media | Green bean seeds were planted into Fafard ® BX potting media into 4-inch round pots |
| Plant spacing | Green bean seeds, were planted into each pot (one seed per pot) |
| Treatment Schedule | Green beans Planted Sep. 22, 2016 First Drench treatment Sep. 23, 2016 Reseeding of the pots with no germination on Oct. 13, 2016 Inoculations to pots of green beans on Oct. 13, 2016 Second Drench treatment Oct. 14, 2016 Third drench treatment Oct. 27, 2016 |
| Fertilization Schedule | Plants were fertilized with liquid fertilizer on Sep. 26, 2016 and Oct. 17, 2016 approximately 2.5 oz of liquid fertilizer was added to each plant. Fertilizer was Miracle-Gro ® Plant Food 24-8-16, which was mixed at 1 tablespoon per gallon of water |
| Data Collection | Collected from all plants prior to harvest. Plant height was measured from the soil to the base of the terminal (youngest) trifoliate. Height was recorded in inches |
| Harvest Schedule | Harvest of green bean plants from pots on Nov. 10-11, 2016 where above shoot was separated from root. The fresh weight of the shoot was recorded. There were two types of evaluations on the foliage. One was a "coloration" of the foliage using a 1-10 scale, where 10 would have been most "Green"; most plants were expressing a "pale green coloration. The Second rating consisted of the percent area of the trifoliate leaf area that exhibited light brown, necrotic spots or flecks. Symptoms that were observed consisted of 1 mm in diameter spots (or flecks) with angular margins. These symptoms were between the leaf veins. These ratings were rated as percent leaf are phytotoxicity |

For all the microalgae formulations 80 mls of suspension was added to the surface of each pot; thus, 3 main effects×15 replicates×80 ml per pot=3600 of solution required for each application. For the 1% solutions, 36 mls was added to the drenching solution. For the 4% solution 144 mls of each formulation was added to the drenching solution.

For the root data, the root mass was immersed into containers of water and the soilless media was "removed" through manual kneading of the root ball so that no breakage of the root system occurred. Roots were subsequently blotted dry between paper towels. The resultant dried roots were weighed on a digital scale. Data were recorded in grams. At the time of weighing, roots were visually assessed for vigor using a 0-10 "Root Vigor" rating (10=most vigorous). The Root Vigor rating was used to determine root size and any increase in the formation of "fine" roots. Higher numbers represented bushier roots with an abundance of fine roots. A collection of roots was used for reference. Each root system was subsequently rated for the severity of symptoms typical for infection by *Rhizoctonia solani*. Symptoms of *Rhizoctonia* included reddish brown lesions that ranged from one single lesion (1-3 mm in length), to numerous 3-7 mm lesions, and even complete girdling of the root at anywhere along the root system.

Figure 2:
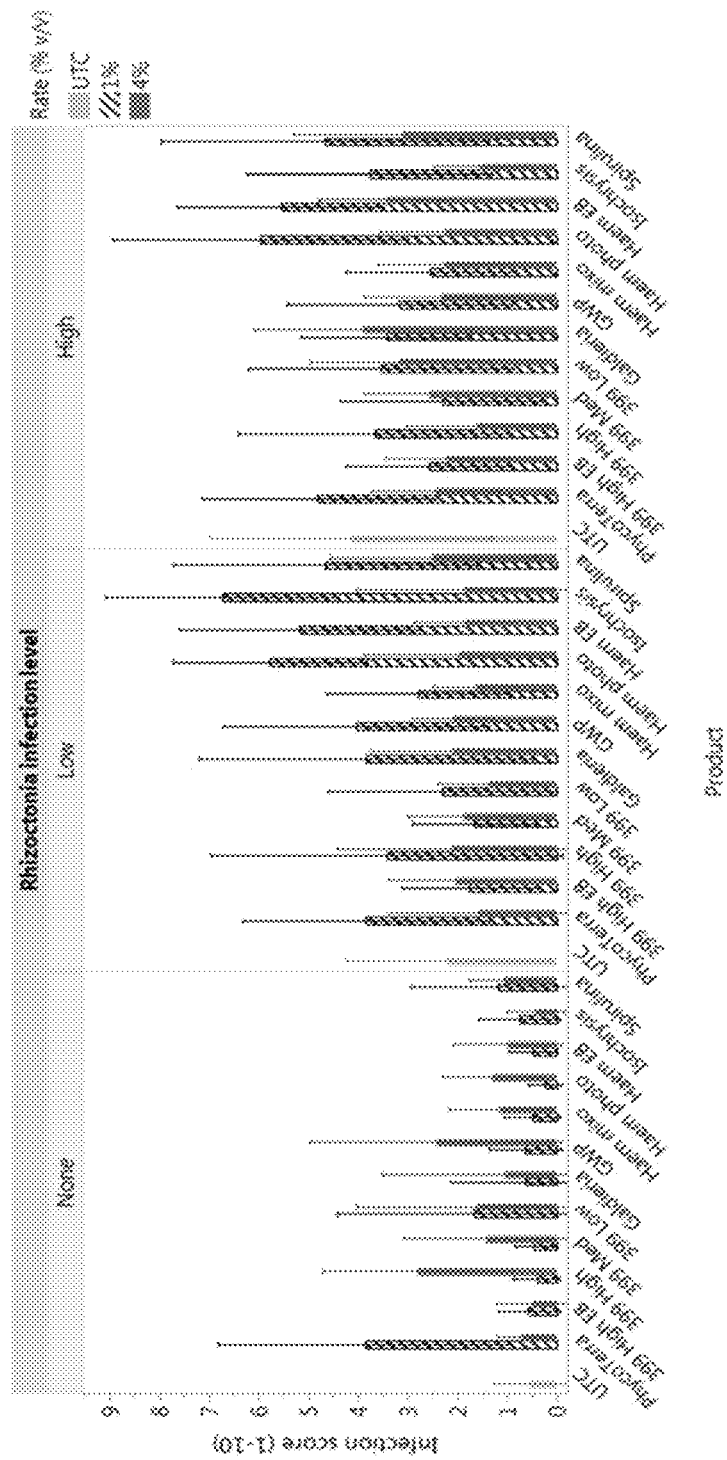
FIG. 2 is a graph showing a comparison of the effects of several microalgae compositions on green been quality, wherein the effects are observed in a decrease in incidence of *Rhizoctonia* on the roots of the green bean plants.

Green beans were seeded and drenched every 2 weeks starting at seed with either water only or one of the 12 microalgae compositions. Three weeks after seeding, the plants were inoculated with one of 3 concentrations (no inoculation, low inoculation, or high inoculation) of the *Rhizoctonia solani* pathogen. Growth and health were assessed 4 weeks after inoculation. Raw data for the effects of the microalgae compositions on the infection severity of the green bean plants are shown in Table 7 below and the results are also further illustrated in FIG. 2.

TABLE 7

Raw Data

| | | Infection severity (1-10) | | | | | |
|---|---|---|---|---|---|---|---|
| Product | Rate (% v/v) | No inoculation | % change over UTC | Low inoculation | % change over UTC | High inoculation | % change over UTC |
| UTC | UTC | 0.6 | | 2.2 | | 4.1 | |
| PhycoTerra ® | 1% | 3.9 | 597% | 3.8 | 75% | 4.8 | 16% |
| PhycoTerra ® | 4% | 0.7 | 28% | 1.6 | −28% | 2.4 | −41% |
| HS399 High Oil EB | 1% | 0.6 | 2% | 1.8 | −20% | 2.6 | −38% |
| HS399 High Oil EB | 4% | 0.5 | −10% | 2.0 | −7% | 2.2 | −47% |
| HS399 High Oil WB | 1% | 0.4 | −28% | 3.4 | 56% | 3.7 | −12% |
| HS399 High Oil WB | 4% | 2.8 | 406% | 2.1 | −4% | 1.6 | −61% |
| HS399 Med Oil WB | 1% | 0.5 | −17% | 1.7 | −24% | 2.3 | −44% |
| HS399 Med Oil WB | 4% | 1.4 | 158% | 1.9 | −14% | 2.6 | −38% |
| HS399 Low Oil WB | 1% | 1.7 | 201% | 2.3 | 5% | 3.5 | −15% |
| HS399 Low Oil WB | 4% | 1.6 | 189% | 1.4 | −38% | 3.2 | −24% |
| *Galdieria* | 1% | 0.6 | 14% | 3.8 | 75% | 3.4 | −17% |
| *Galdieria* | 4% | 1.1 | 90% | 2.1 | −4% | 3.9 | −6% |
| GWP (*Scenedesmus*) | 1% | 0.6 | 16% | 4.0 | 84% | 3.2 | −24% |
| GWP (*Scenedesmus*) | 4% | 2.4 | 339% | 2.1 | −4% | 2.3 | −44% |
| *Haematococcus* mixotrophic | 1% | 0.5 | −10% | 2.8 | 26% | 2.5 | −39% |
| *Haematococcus* mixotrophic | 4% | 1.2 | 108% | 1.6 | −25% | 2.3 | −45% |
| *Haematococcus* phototrophic | 1% | 0.3 | −55% | 5.8 | 163% | 6.0 | 44% |
| *Haematococcus* phototrophic | 4% | 1.3 | 135% | 2.0 | −10% | 2.3 | −46% |
| *Haematococcus* phototrophic EB | 1% | 0.5 | −10% | 5.2 | 136% | 5.5 | 34% |
| *Haematococcus* phototrophic EB | 4% | 1.0 | 81% | 1.8 | −16% | 3.4 | −17% |
| *Isochrysis* | 1% | 0.8 | 38% | 6.7 | 207% | 3.8 | −9% |
| *Isochrysis* | 4% | 0.4 | −23% | 1.9 | −16% | 1.5 | −63% |
| *Spirulina* | 1% | 1.2 | 113% | 4.7 | 112% | 4.7 | 13% |
| *Spirulina* | 4% | 1.1 | 93% | 2.5 | 14% | 3.1 | −25% |

Infection levels were scored for all treatments and were highly variable for plants that did not receive the *Rhizoctonia* pathogen 3 weeks after seeding. This suggests some cross contamination. Due to this, conclusions are primarily drawn from those plants receiving a "high" inoculation of the *Rhizoctonia*. For plants that received high amounts of *Rhizoctonia*, most of the microalgae treatments showed advantages over the untreated control (UTC) in terms of reducing the *Rhizoctonia* infection level on the roots (10-60%). The best results were observed from the 4% v/v solution of PHYCOTERRA® microalgae composition, the *Aurantiochytrium acetophilum* HS399 high oil EB microalgae composition and *Aurantiochytrium acetophilum* HS399 high oil WB microalgae composition, *Aurantiochytrium acetophilum* HS399 Med oil WB microalgae composition, GWP, and *Isochrysis* microalgae composition (50-60% reduction). Both rates of *Haematococcus* mixotrophic microalgae composition were beneficial as well.

Figure 3:
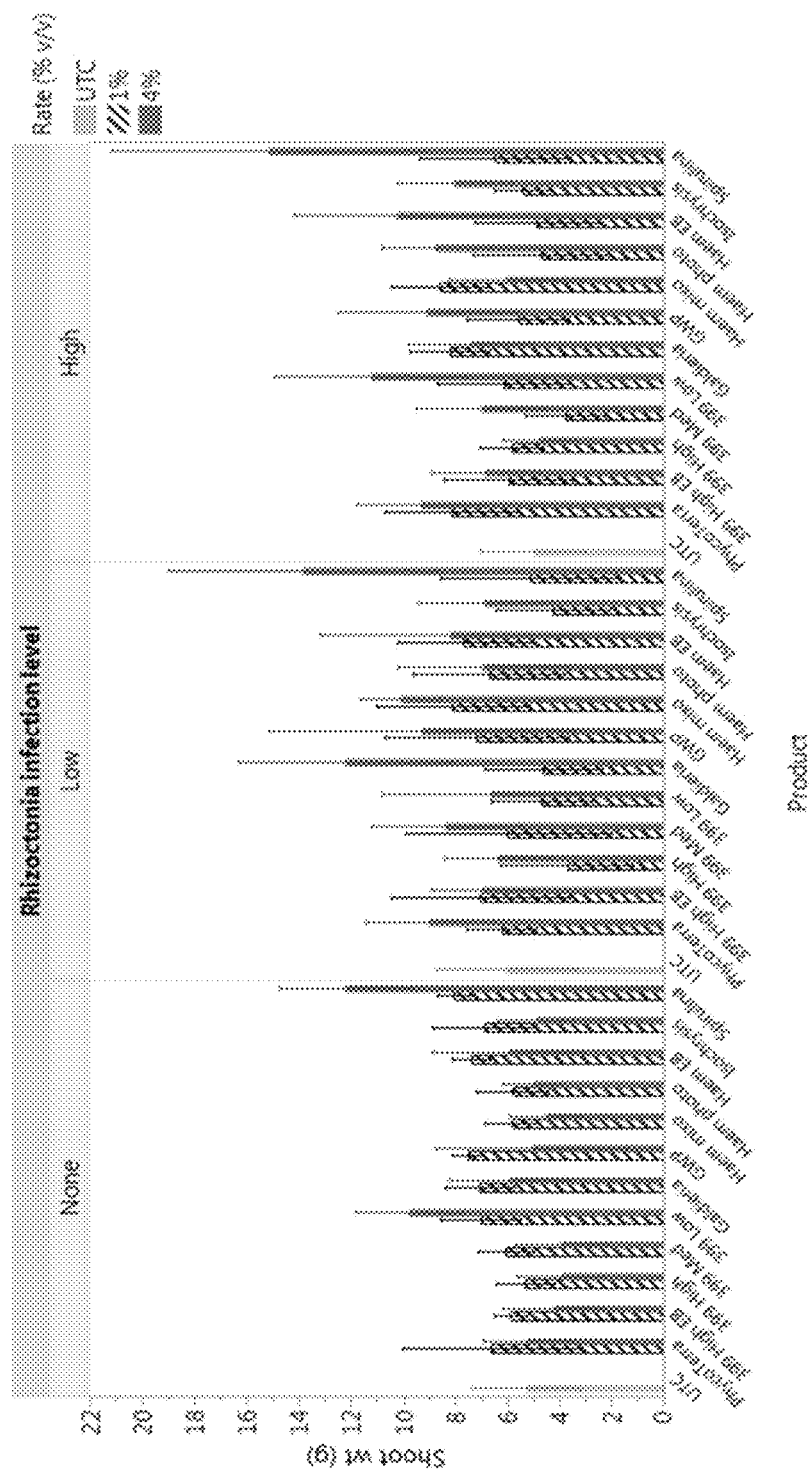
FIG. 3 is a graph showing a comparison of the effects of several microalgae compositions on green been quality, wherein the effects are observed in an increase in shoot growth of the green bean plants despite their infection with *Rhizoctonia*.

Raw data for the effects of the microalgae compositions on the shoot weight of the green bean plants are shown in Table 8 below and the results are also further illustrated in FIG. 3.

TABLE 8

Raw Data

| | | Shoot weight (g) | | | | | |
|---|---|---|---|---|---|---|---|
| Product | Rate (% v/v) | No inoculation | % change over UTC | Low inoculation | % change over UTC | High inoculation | % change over UTC |
| UTC | UTC | 5.3 | | 6.0 | | 5.0 | |
| PhycoTerra ® | 1% | 6.6 | 26% | 6.2 | 3% | 8.1 | 62% |
| PhycoTerra ® | 4% | 5.2 | −1% | 9.0 | 49% | 9.3 | 86% |
| HS399 High Oil EB | 1% | 5.8 | 11% | 7.0 | 17% | 6.0 | 19% |
| HS399 High Oil EB | 4% | 4.2 | −20% | 7.0 | 15% | 6.8 | 37% |
| HS399 High Oil WB | 1% | 5.3 | 1% | 3.7 | −39% | 5.8 | 16% |
| HS399 High Oil WB | 4% | 3.9 | −26% | 6.4 | 6% | 4.8 | −5% |
| HS399 Med Oil WB | 1% | 6.1 | 16% | 6.0 | −1% | 3.8 | −25% |
| HS399 Med Oil WB | 4% | 3.9 | −25% | 8.4 | 39% | 7.0 | 40% |
| HS399 Low Oil WB | 1% | 7.0 | 33% | 4.7 | −22% | 6.1 | 22% |
| HS399 Low Oil WB | 4% | 9.8 | 86% | 6.6 | 10% | 11.2 | 125% |
| *Galdieria* | 1% | 7.1 | 34% | 4.6 | −23% | 8.2 | 64% |
| *Galdieria* | 4% | 5.9 | 12% | 12.2 | 103% | 7.4 | 48% |
| GWP (*Scenedesmus*) | 1% | 7.5 | 43% | 7.2 | 19% | 5.6 | 11% |
| GWP (*Scenedesmus*) | 4% | 5.0 | −4% | 9.3 | 54% | 9.1 | 82% |

TABLE 8-continued

Raw Data

| | | Shoot weight (g) | | | | | |
|---|---|---|---|---|---|---|---|
| Product | Rate (% v/v) | No inoculation | % change over UTC | Low inoculation | % change over UTC | High inoculation | % change over UTC |
| *Haematococcus* mixotrophic | 1% | 5.8 | 10% | 8.1 | 34% | 8.6 | 72% |
| *Haematococcus* mixotrophic | 4% | 4.5 | −14% | 10.1 | 68% | 6.0 | 21% |
| *Haematococcus* phototrophic | 1% | 5.8 | 10% | 6.7 | 11% | 4.7 | −6% |
| *Haematococcus* phototrophic | 4% | 5.0 | −5% | 6.9 | 15% | 8.7 | 75% |
| *Haematococcus* phototrophic EB | 1% | 7.4 | 40% | 7.6 | 27% | 4.9 | −3% |
| *Haematococcus* phototrophic EB | 4% | 5.9 | 13% | 8.2 | 36% | 10.2 | 105% |
| *Isochrysis* | 1% | 6.9 | 31% | 4.2 | −30% | 5.4 | 8% |
| *Isochrysis* | 4% | 4.9 | −7% | 6.9 | 14% | 8.0 | 60% |
| *Spirulina* | 1% | 8.0 | 53% | 5.1 | −15% | 6.5 | 29% |
| *Spirulina* | 4% | 12.2 | 132% | 13.9 | 130% | 15.1 | 203% |

Infection levels observed in this Example can cause reduced growth of the roots and shoots. There were advantages observed for some microalgae treatments across all infection levels, suggesting microalgae can promote growth with and without stress. Compared to the untreated control (UTC), higher shoot growth was enhanced particularly by drench applications of *Aurantiochytrium acetophilum* HS399 low oil WB microalgae composition, *Galdieria* microalgae composition, GWP, *Haematococcus* mixotrophic EB microalgae composition and *Spirulina* microalgae composition.

Figure 4:
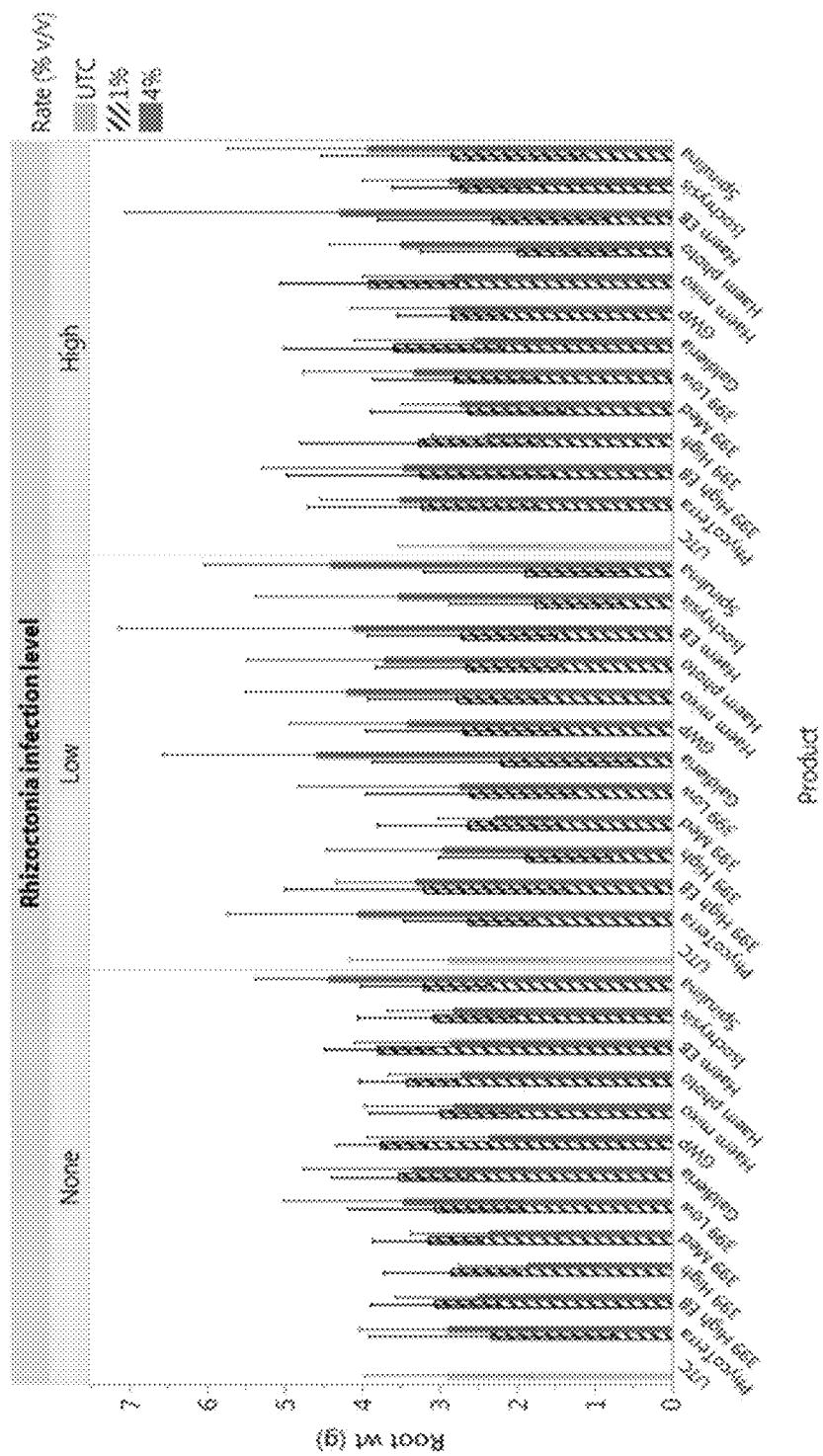
FIG. 4 is a graph showing a comparison of the effects of several microalgae compositions on green been quality, wherein the effects are observed in an increase in root growth of the green bean plants despite their infection with *Rhizoctonia*.

Raw data for the effects of the microalgae compositions on the root weight of the green bean plants are shown in Table 9 below and the results are also further illustrated in FIG. 4.

TABLE 9

Raw Data

| | | Root weight (g) | | | | | |
|---|---|---|---|---|---|---|---|
| Product | Rate (% v/v) | No inoculation | % change over UTC | Low inoculation | % change over UTC | High inoculation | % change over UTC |
| UTC | UTC | 2.9 | | 2.9 | | 2.6 | |
| PhycoTerra ® | 1% | 2.3 | −19% | 2.6 | −9% | 3.2 | 24% |
| PhycoTerra ® | 4% | 2.9 | 0% | 4.1 | 40% | 3.5 | 34% |
| HS399 High Oil EB | 1% | 3.1 | 6% | 3.2 | 11% | 3.3 | 24% |
| HS399 High Oil EB | 4% | 2.5 | −13% | 3.3 | 14% | 3.5 | 33% |
| HS399 High Oil WB | 1% | 2.8 | −2% | 1.9 | −34% | 3.3 | 25% |
| HS399 High Oil WB | 4% | 1.9 | −36% | 3.0 | 2% | 2.4 | −8% |
| HS399 Med Oil WB | 1% | 3.2 | 9% | 2.6 | −9% | 2.6 | 1% |
| HS399 Med Oil WB | 4% | 2.4 | −18% | 2.3 | −20% | 2.7 | 4% |
| HS399 Low Oil WB | 1% | 3.1 | 6% | 2.6 | −10% | 2.8 | 7% |
| HS399 Low Oil WB | 4% | 3.5 | 20% | 2.7 | −5% | 3.3 | 27% |
| *Galdieria* | 1% | 3.5 | 22% | 2.2 | −23% | 3.6 | 37% |
| *Galdieria* | 4% | 3.4 | 16% | 4.6 | 58% | 2.6 | −2% |
| GWP (*Scenedesmus*) | 1% | 3.8 | 30% | 2.7 | −6% | 2.8 | 9% |
| GWP (*Scenedesmus*) | 4% | 2.4 | −19% | 3.4 | 18% | 2.9 | 10% |
| *Haematococcus* mixotrophic | 1% | 3.0 | 3% | 2.8 | −4% | 3.9 | 49% |
| *Haematococcus* mixotrophic | 4% | 2.8 | −3% | 4.2 | 45% | 2.8 | 8% |
| *Haematococcus* phototrophic | 1% | 3.4 | 18% | 2.7 | −8% | 2.0 | −24% |
| *Haematococcus* phototrophic | 4% | 2.7 | −6% | 3.7 | 28% | 3.5 | 34% |
| *Haematococcus* phototrophic EB | 1% | 3.8 | 31% | 2.7 | −6% | 2.3 | −11% |
| *Haematococcus* phototrophic EB | 4% | 2.9 | −1% | 4.1 | 42% | 4.3 | 64% |
| *Isochrysis* | 1% | 3.1 | 6% | 1.8 | −39% | 2.7 | 4% |
| *Isochrysis* | 4% | 2.8 | −2% | 3.5 | 22% | 2.9 | 10% |
| *Spirulina* | 1% | 3.2 | 11% | 1.9 | −34% | 2.8 | 9% |
| *Spirulina* | 4% | 4.4 | 53% | 4.4 | 53% | 3.9 | 50% |

Root growth was promoted by microalgae composition drench applications across conditions. The best results were seen with the 4% solution of PHYCOTERRA® microalgae composition (34-40% in low to high inoculation conditions), *Aurantiochytrium acetophilum* HS399 high oil EB microalgae composition (24-33% in high inoculation conditions), 4% solution of *Haematococcus* mixotrophic EB microalgae composition (42-64% in low to high inoculation conditions), and *Spirulina* microalgae composition (50-53% across all conditions).

Figure 5:
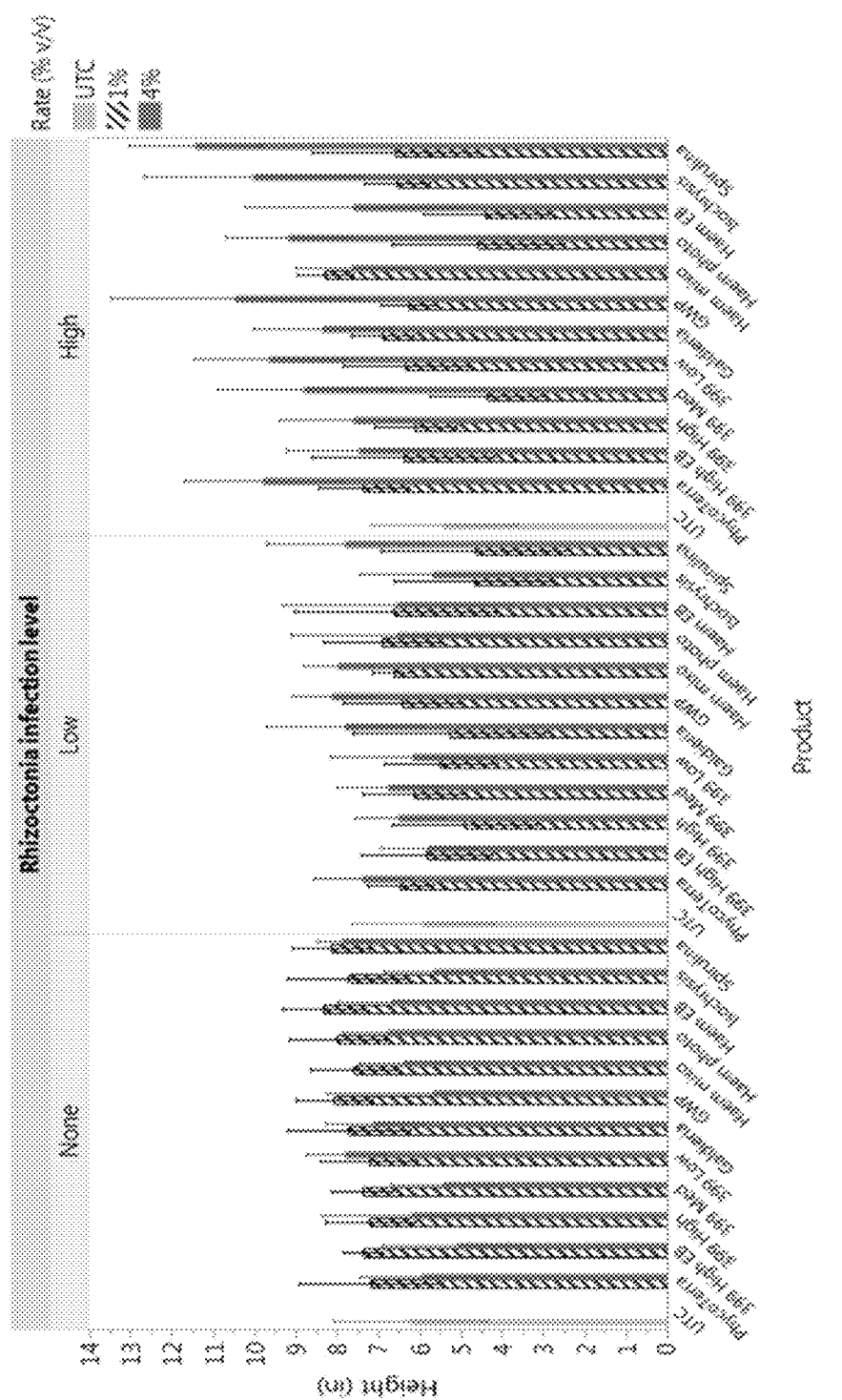
FIG. 5 is a graph showing a comparison of the effects of several microalgae compositions on green been quality, wherein the effects are observed in an increase in height of the green bean plants despite their infection with *Rhizoctonia*.

Raw data for the effects of the microalgae compositions on the plant height of the green bean plants are shown in Table 10 below and the results are also further illustrated in FIG. 5.

against biotic stressors such as plant pathogenic bacteria, fungi, and fungi-like organisms were tested on tomato, canola, and *Arabidopsis thaliana*. Biotic stress tests were performed using fungal disease (*Sclerotinia sclerotiorum*), bacterial disease (*Pseudomonas syringae* pathovar tomato), and the fungal-like oomycete *Phytophthora infestans*. In addition, the effects of *P. syringae* pathovar tomato on *Arabidopsis thaliana* Col-0, in the presence of the PHYCOTERRA® *Chlorella* microalgae composition, were also assessed at molecular level by determining changes in the expression of pathogenesis-related protein 1 (PR1) and of plant defensin 1.2 (PDF1.2) genes. These genes are markers of plant defense mechanisms activation.

TABLE 10

Raw Data

| Product | Rate (% v/v) | Plant Height (in.) | | | | | |
|---|---|---|---|---|---|---|---|
| | | No inoculation | % change over UTC | Low inoculation | % change over UTC | High inoculation | % change over UTC |
| UTC | UTC | 6.2 | | 5.9 | | 5.4 | |
| PhycoTerra ® | 1% | 7.2 | 15% | 6.5 | 9% | 7.4 | 36% |
| PhycoTerra ® | 4% | 6.0 | −4% | 7.4 | 25% | 9.8 | 81% |
| HS399 High Oil EB | 1% | 7.4 | 18% | 5.8 | −1% | 6.4 | 18% |
| HS399 High Oil EB | 4% | 5.1 | −18% | 5.8 | −2% | 7.5 | 38% |
| HS399 High Oil WB | 1% | 7.2 | 16% | 4.9 | −17% | 6.1 | 13% |
| HS399 High Oil WB | 4% | 6.2 | 0% | 6.5 | 10% | 7.6 | 40% |
| HS399 Med Oil WB | 1% | 7.4 | 19% | 6.1 | 4% | 4.4 | −20% |
| HS399 Med Oil WB | 4% | 5.4 | −13% | 6.8 | 14% | 8.8 | 62% |
| HS399 Low Oil WB | 1% | 7.2 | 16% | 5.5 | −7% | 6.3 | 17% |
| HS399 Low Oil WB | 4% | 7.8 | 25% | 6.2 | 4% | 9.6 | 78% |
| *Galdieria* | 1% | 7.7 | 24% | 5.3 | −11% | 6.9 | 27% |
| *Galdieria* | 4% | 7.1 | 14% | 7.8 | 32% | 8.4 | 54% |
| GWP (*Scenedesmus*) | 1% | 8.1 | 30% | 6.4 | 9% | 6.3 | 16% |
| GWP (*Scenedesmus*) | 4% | 5.7 | −9% | 8.1 | 37% | 10.5 | 93% |
| *Haematococcus* mixotrophic | 1% | 7.6 | 22% | 6.6 | 12% | 8.3 | 53% |
| *Haematococcus* mixotrophic | 4% | 6.4 | 3% | 8.0 | 35% | 7.6 | 41% |
| *Haematococcus* phototrophic | 1% | 8.0 | 29% | 6.9 | 17% | 4.6 | −15% |
| *Haematococcus* phototrophic | 4% | 6.8 | 9% | 6.5 | 10% | 9.2 | 69% |
| *Haematococcus* phototrophic EB | 1% | 8.3 | 34% | 6.6 | 12% | 4.4 | −19% |
| *Haematococcus* phototrophic EB | 4% | 6.7 | 7% | 6.5 | 10% | 7.6 | 40% |
| *Isochrysis* | 1% | 7.7 | 24% | 4.7 | −21% | 6.5 | 21% |
| *Isochrysis* | 4% | 5.6 | −9% | 5.7 | −4% | 10.0 | 85% |
| *Spirulina* | 1% | 8.1 | 31% | 4.6 | −22% | 6.6 | 22% |
| *Spirulina* | 4% | 7.9 | 26% | 7.8 | 32% | 11.4 | 111% |

Height advantages were common with microalgae composition drench applications but advantages were most pronounced after high inoculation of *Rhizoctonia*. Plant height was increased by 36-81% by PHYCOTERRA® microalgae composition, 17-78% by *Aurantiochytrium acetophilum* HS399 low oil WB microalgae composition, 27-54% by *Galdieria* microalgae composition, 16-93% by GWP, 41-53% by *Haematococcus* mixotrophic WB microalgae composition, 21-85% by *Isochrysis* microalgae composition, and 22->100% by *Spirulina* microalgae composition.

Example 4

Examples 4-6 summarize multiple trials aimed to determine the effects of the PHYCOTERRA® *Chlorella* microalgae composition on pathogenic bacteria and fungi on multiple crops. The potential protective effect of the PHYCOTERRA® *Chlorella* microalgae composition This trial was conducted in order to assess the effects of the PHYCOTERRA® *Chlorella* microalgae composition using the white mold *Sclerotinia sclerotiorum* and canola plants as the pathogen-host model. The effects of *S. sclerotiorum* on canola (variety L 5540) were assessed by determining disease incidence and disease severity. The control in the experiment employed treatment with 10 ml of water, mock solution and 4 concentrations, i.e. 0.1 ml/L, 0.5 ml/L, 1 ml/L and 2.5 ml/L of the PHYCOTERRA® *Chlorella* microalgae composition. Foliar and soil drench treatments were applied 24 h before the infection with *S. sclerotiorum*. The same design was used for plants that were infected with *S. sclerotiorum*. Five plants were used for each treatment and control. For infection, *S. sclerotiorum* was grown on PDA medium for 3 days. At the time of infection, canola plants were 21 days old. At this stage all the plants had well-developed leaves and they were infected by placing a plug with a diameter of 5 mm on the middle of the adaxial side of the two leaves of each plant. Disease progression was observed at 4 dpi (days post inoculation). Raw data for this Example is shown in Table 11 below.

TABLE 11

Raw Data

Avg. Size of lesion (mm) 4 dpi

| | Soil drench | % change from UTC | Foliar | % change from UTC |
|---|---|---|---|---|
| UTC | 18.6 | | 21.7 | |
| Mock 2.5 mL/L | 9.9 | −46% | 21.3 | −2% |
| 0.1 mL/L | 11.4 | −39% | 17.4 | −20% |
| 0.5 mL/L | 11.1 | −40% | 20.1 | −7% |
| 1.0 mL/L | 15.5 | −17% | 22.2 | 2% |
| 2.5 mL/L | 19.2 | 3% | 22.6 | 4% |

Figure 6:
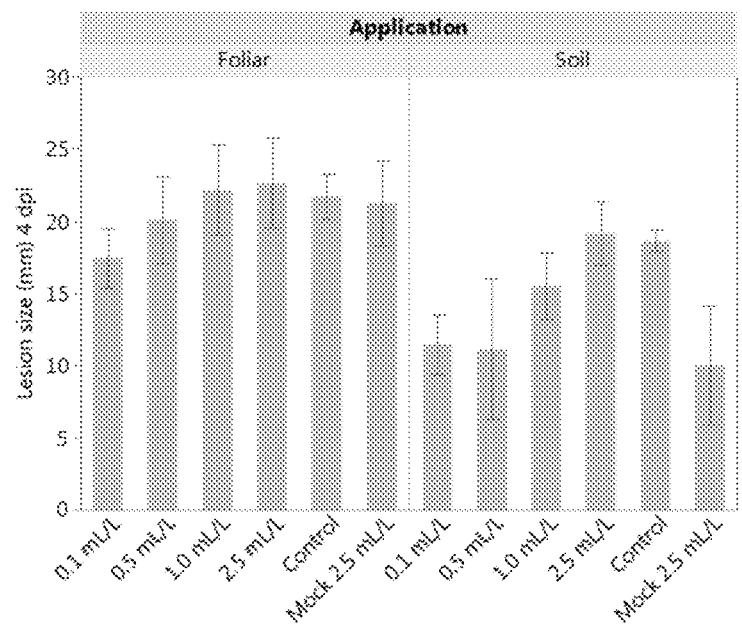
FIG. 6 is a graph showing the effects of PHYCO-TERRA® *Chlorella* microalgae composition on canola plant quality, wherein the effects are observed in a decrease in *Sclerotinia sclerotiorum* lesion size on the canola plant.

As shown in FIG. 6, the PHYCOTERRA® *Chlorella* microalgae composition drench reduced the incidence of infection of *Sclerotinia* on canola. The soil drench application of the PHYCOTERRA® *Chlorella* microalgae composition (0.1-1 mL/L) was more effective than foliar application in reducing infection of canola by *Sclerotinia* and ranged from 17-40% reduction in lesion size. Reduction range for foliar application was 9-30%. Across both application methods, the best performing treatment was the lowest rate of the PHYCOTERRA® *Chlorella* microalgae composition (0.1 mL/L) showing a 20-40% reduction in lesion size. This suggest there is a biostimulant effect. A mock nutrient solution matching the nutrient content of the PHYCOTERRA® *Chlorella* microalgae composition 2.5 mL/L was also effective at reducing the lesion size when applied as a drench only but at twice the rate that the PHYCOTERRA® *Chlorella* microalgae composition showed efficacy.

Example 5

This trial was conducted in order to assess the effects of the PHYCOTERRA® *Chlorella* microalgae composition using the plant pathogenic bacteria *Pseudomonas syringae* pathovar tomato and tomato plants as pathogen-host model. The effects of the plant pathogenic bacteria *P. syringae* pathovar tomato on tomato plants were assessed by determining disease severity. Tomato seeds, variety Scotia, were planted in pots filled with Promix and maintained in growth chamber set at 22° C. with 16-h light/8-h dark cycle with light intensity of 100 $\mu mol \cdot m^{-2} s^{-1}$. After four weeks uniform plants were selected and used in the experiment. An amount of 10 ml of PHYCOTERRA® per plant was applied both as foliar and soil drench at the concentration of 1 and 2.5 ml/L, 24 hours prior to pathogen inoculation. *P. syringae* pathovar tomato strain DC3000 was cultured in King's B medium supplemented with 50 µg ml$^{-1}$ of rifampicin at 28° C. until the culture reached an $OD_{600}$ of 0.8. The bacterial cells were collected by centrifugation and resuspended in water containing 0.02% Silwet L-77 (Lehle seeds, USA) to the final concentration of $10^8$ cfu ml$^{-1}$. The plants were spray inoculated and kept under high humidity to let the disease to develop. Disease symptoms in treated and control plants were monitored from 2 to 4 dpi. Disease severity was recorded 3 dpi for 4 replicate leaves per treatment. Raw data for this Example is shown in Table 12 below.

TABLE 12

Raw Data

Disease Severity 3 dpi

| | Soil drench | % change from UTC | Foliar | % change from UTC | Disease scale 0 = no lesion |
|---|---|---|---|---|---|
| UTC | 2.75 | | 2.75 | | 1 = 1-25 lesion |
| Mock 2.5 mL/L | 2.75 | | 2.75 | | 2 = 26-50 lesion |
| 1.0 mL/L | 1.25 | −55% | 0.75 | −73% | 3 = 51-75 lesion |
| 2.5 mL/L | 1.25 | −55% | 0.5 | −82% | 4 = 76-100 lesion |

Figure 7:
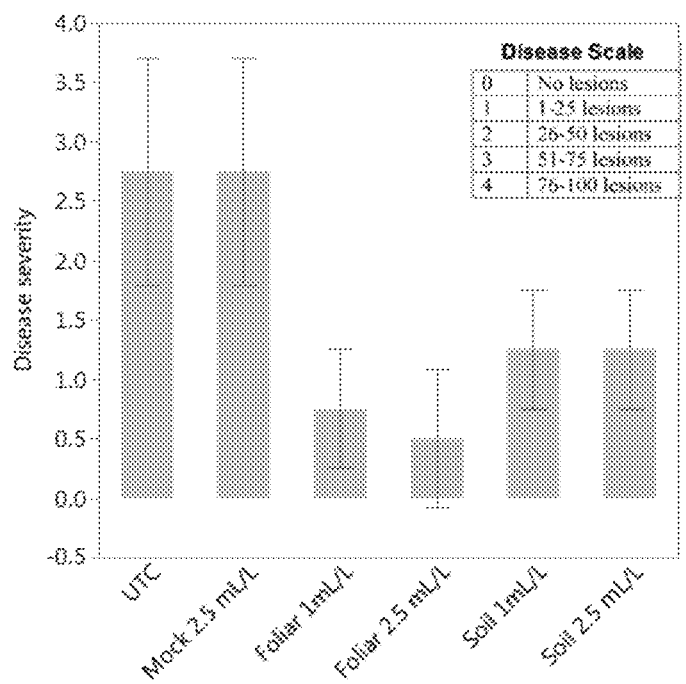
FIG. 7 is a graph showing the effects of PHYCO-TERRA® *Chlorella* microalgae composition on tomato plant quality, wherein the effects are observed in a decrease in severity of *Pseudomonas syringae* on the tomato plant.

As shown in FIG. 7, the PHYCOTERRA® *Chlorella* microalgae composition reduced the incidence of infection of *P. syringae* on tomatoes. The plants treated with the PHYCOTERRA® *Chlorella* microalgae composition were less infected with *P. syringae* pathovar tomato, strain DC3000, as compared to the untreated control and mock treated plants. Both foliar and soil drench were effective, showing a >50% reduction, but foliar was effective to more of a degree. Plants treated with a mock media treatment that had similar nutrient content to the PHYCOTERRA® *Chlorella* microalgae composition showed worse infection than those treated with the PHYCOTERRA® *Chlorella* microalgae composition, suggesting more than just a nutrient effect of the treatment.

Example 6

This trial was conducted in order to assess the effects of the PHYCOTERRA® *Chlorella* microalgae composition using the plant pathogenic bacteria *Pseudomonas syringae* pathovar tomato and *Arabidopsis thaliana* Col-0 plants as pathogen-host model. In order to study the effects of microalgal extract on expression of defense response genes in *Arabidopsis thaliana* Col-0, the *A. thaliana* seeds were planted on Jiffy peat pellets, and maintained in a growth chamber set at 22° C. with 16-h light/8-h dark cycle with light intensity of 100 $\mu mol \cdot m^{-2} s^{-1}$. After three weeks, uniform plants were selected and used in the experiment. The plants were treated with the PHYCOTERRA® *Chlorella* microalgae composition at a concentration of 2.5 ml/L as a soil drench application 24 hrs prior to pathogen inoculation.

The pathogen was inoculated as described above in Example 5. The samples (leaves) were collected at 24 and 48 hours post inoculation and immediately flash frozen into liquid nitrogen. Total RNA was isolated from the un-inoculated and inoculated plants following a method described by (Chomczynski and Sacchi, 1987). RNA concentration and quality were assessed using the Nanodrop 2000 Spectrophotometer (Thermo Scientific, Ontario, Canada). Two micrograms of RNA were treated with 2 units of RQ1 DNAse (Promega, Ontario, Canada) according to manufacturer's instructions. cDNA was synthesized using an Applied Biosystems high capacity cDNA synthesis kit (Applied Biosystems Ontario, Canada) using the manufacturer's protocol. Relative transcript levels were determined by quantitative Real-Time polymerase chain reaction on StepOne™ Real-Time PCR system (Applied Biosystems, Ontario, Canada) using SYBR green (Applied Biosystems). Gene specific primer sequences were designed using the primer 3 plus software. The primers were flanking an intron-spanning region. Raw data for this Example is shown in Table 13 below.

TABLE 13

Raw Data

Gene expression levels of PR1 and PDF1.2

| | | Un-infected | | | Infected | | | |
|---|---|---|---|---|---|---|---|---|
| | | PR1 | % change over UTC | PDF1.2 | % change over UTC | PR1 | % change over UTC | PDF1.2 | % change over UTC |
| Control | 24 hrs | 1.598677 | | 1.259937 | | 2.518992 | | 8.574605 | |
| Media | | 1.502412 | −6% | 1.804379 | 43% | 1.304241 | −48% | 3.957211 | −54% |
| 2.5 mL/L | | 1.084063 | −32% | 2.185182 | 73% | 7.152435 | 184% | 19.4587 | 127% |
| Control | 48 hrs | 6.950916 | | 12.1877 | | 518.28 | | 538.5764 | |
| Media | | 9.462352 | 36% | 14.16234 | 16% | 459.7687 | −11% | 531.6697 | −1% |
| 2.5 mL/L | | 25.84347 | 272% | 48.77439 | 300% | 2151.587 | 315% | 3685.711 | 584% |

As shown, the PHYCOTERRA® *Chlorella* microalgae composition increased the defense response of *Arabidopsis* to *P. syringae*. The test was performed at molecular level (quantitative real time PCR) by determining changes in the expression of pathogenesis-related protein 1 (PR1) and of plant defensin 1.2 (PDF1.2) genes. The expression of these markers of plant defense mechanisms activation was found to be changed by the application of 2.5 ml/L of the PHYCOTERRA® *Chlorella* microalgae composition as well after infection with *P. syringae* of treated plants (>200% compared to the control). Treatment with 2.5 ml/L of the PHYCOTERRA® *Chlorella* microalgae composition determined a slight up-regulation of gene expression of PDF1.2 after 24 h and a much stronger up-regulation after 48 h of both PDF1.2 and PR1. The expression of both genes was found to be dramatically changed after infection with *P. syringae* when the two time points were compared (300-500%). Also, at both time points, PR1 and PDF1.2 showed higher levels of expression in plants treated with the PHYCOTERRA® *Chlorella* microalgae composition. These results suggest that the PHYCOTERRA® *Chlorella* microalgae composition treatment can prime defense responses in *A. thaliana*, therefore enhancing plant resistance to pathogens.

Example 7

A field trial was initiated in Salinas, Monterey Calif. on May 22, 2018 where the PHYCOTERRA® *Chlorella* microalgae composition was applied at 1 gal/acre by drip irrigation to a 3-acre test plot of Maverick variety strawberry. The soil that the strawberries were planted in was Clear Lake Clay, Sandy substratum soil (100%). This trial was initiated on a well-established field of strawberries. The PHYCOTERRA® *Chlorella* microalgae composition was applied every 2 weeks. Raw data for this Example is shown in Table 14 below.

TABLE 14

Raw Data

| Random | Untreated Control | | PhycoTerra ® treated | |
|---|---|---|---|---|
| Sample Section | No. Healthy Plants | No. Infected Plants | No. Healthy Plants | No. Infected Plants |
| 1 | 35 | 18 | 52 | 2 |
| 2 | 47 | 4 | 53 | 2 |
| 3 | 32 | 12 | 48 | 5 |
| 4 | 35 | 12 | 42 | 7 |
| 5 | 39 | 13 | 50 | 2 |
| Total | 188 | 59 | 245 | 18 |
| Average | 37.6 | 11.8 | 49 | 3.6 |
| Percent Infected Plants | | 23.9% | | 6.8% |

At 5 weeks after the first application, it was observed that there was less evidence of *verticillium* wilt disease in the section of the strawberries treated with the PHYCOTERRA® *Chlorella* microalgae composition. At six weeks after the first application a study was done to compare the percentage of plants exhibiting *verticillium* wilt disease between the control plot and the plot treated with the PHYCOTERRA® *Chlorella* microalgae composition. The percentage of plants with symptoms of *verticillium* was 23.9% for the untreated control section of the trial and was 6.8% for the section treated with the PHYCOTERRA® *Chlorella* microalgae composition.

Example 8

A field trial was initiated in San Luis Obispo, Calif. on Mar. 19, 2019. This trial tested the efficacy of PHYCOTERRA® *Chlorella* microalgae composition under biotic stress conditions in a common vegetable such as lettuce. The pathogen that was inoculated into the soil and evaluated in this trial was *Sclerotinia*, a very common soil borne pathogen. Lettuce was infested with this pathogen at 1-2 Sclerotia/plant at transplanting. The experiment used three different treatments with different rates and number of applications (see Table 15). The first application of PHYCOTERRA® *Chlorella* microalgae composition was applied right after transplanting lettuce seedlings via soil injection shank, while the other applications were administered via drip irrigation. Six replications were used in a randomized complete block design experiment. After 51 days, the trial was harvested; soil and leaf tissue analysis were also carried out.

TABLE 15

| | Treatments | |
|---|---|---|
| Treatment number | Product | Application Rate (Gal/A) |
| 1 | Untreated | N/A |
| 2 | PhycoTerra ® 1 gal/A | 1 (2 applications, one at transplant and one month later) |
| 3 | PhycoTerra ® 0.5 gal/A | 0.5 (5 applications at weekly intervals) |

Figure 8:
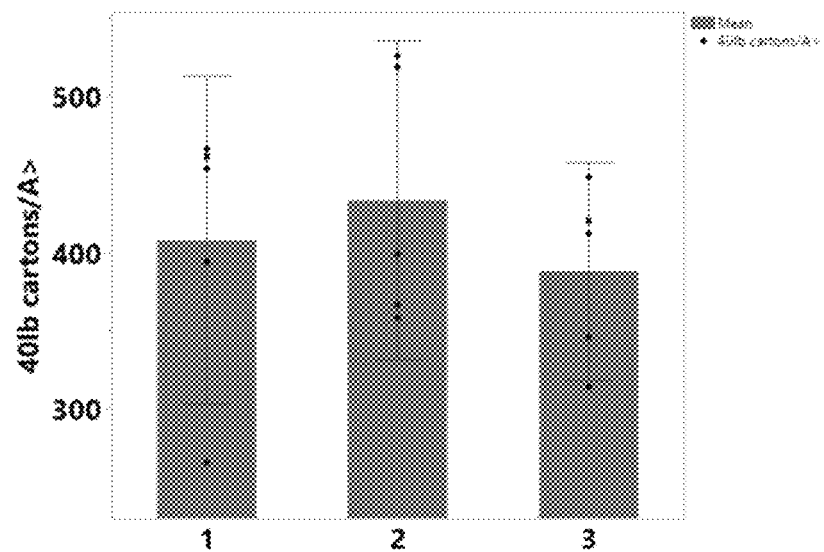
FIG. 8 is a graph showing the effects of PHYCO-TERRA® *Chlorella* microalgae composition on yield of romaine lettuce under biotic stress of *Sclerotinia*, wherein the effects are observed in an increase in the average yield of lettuce.

As shown in Table 16 and in FIG. 8, average yield was increased by 6% when 2 gallons per acre were applied during the season.

TABLE 16

| Lettuce Yield | |
|---|---|
| Treatments | Average |
| Untreated | 407.94 |
| PhycoTerra ® 1 gal/A | 433.54 |
| PhycoTerra ® 0.5 gal/A | 388.13 |
| Average Change (%) | |
| PhycoTerra ® 1 gal/A | 6.28 |
| PhycoTerra ® 0.5 gal/A | −4.86 |

Figure 9:
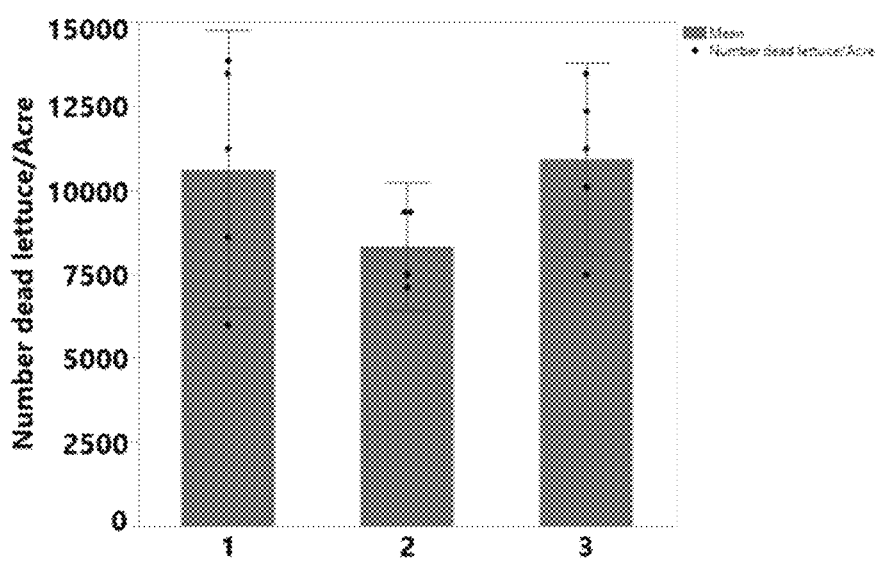
FIG. 9 is a graph showing the effects of PHYCO-TERRA® *Chlorella* microalgae composition on resilience of romaine lettuce under biotic stress of *Sclerotinia*, wherein the effects are observed in a reduction of dead lettuce.

Referring to Table 17 and FIG. 9, a 22% reduction of dead lettuce was also shown with two applications of PHYCOTERRA® *Chlorella* microalgae composition at 1 gal/A under pathogen stress.

TABLE 17

| Lettuce Drop Per Acre | |
|---|---|
| Treatments | Lettuce drop/Acre |
| Untreated | 10614.36 |
| PhycoTerra ® 1 gal/A | 8315.825 |
| PhycoTerra ® 0.5 gal/A | 10913.36 |
| Average Change (%) | |
| PhycoTerra ® 1 gal/A | −21.65 |
| PhycoTerra ® 0.5 gal/A | 2.82 |

Figure 10:
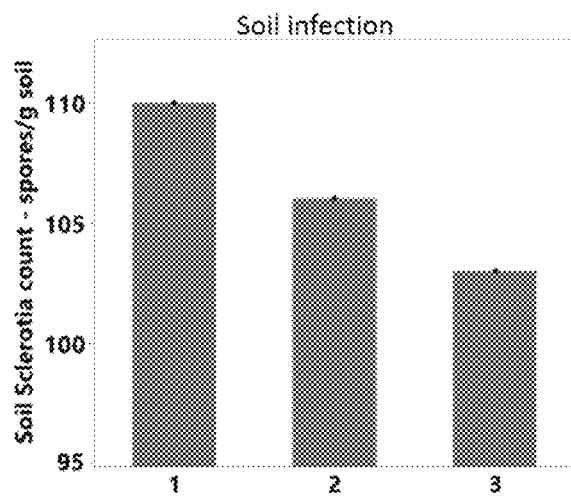
FIG. 10 is a graph showing the effects of PHYCO-TERRA® *Chlorella* microalgae composition on soil of romaine lettuce under biotic stress of *Sclerotinia*, wherein the effects are observed in a reduction of *Sclerotinia* spores in the soil.

Soil analysis was also carried out at two different times; one at 9 days after transplant and the second at 50 days after transplant (DAT). The results at 9 days after transplant showed a reduction of 4% and 6% in the number of spores in the soil after applying PHYCOTERRA® *Chlorella* microalgae composition at 0.5 and 1 gal/A respectively. The results also showed at 50 days after transplant a reduction of 25% and 20% of pathogen spores after application of PHYCOTERRA® *Chlorella* microalgae composition at 0.5 and 1 gal/A respectively (see Table 18 and FIG. 10).

TABLE 18

| *Sclerotinia* Spores in Soil | | |
|---|---|---|
| Treatments | spores/g soil 9 DAT | spores/g soil 50 DAT |
| Untreated | 110 | 126 |
| PhycoTerra ® 1 gal/A | 106 | 94 |
| PhycoTerra ® 0.5 gal/A | 103 | 101 |
| Average Change (%) | | |
| PhycoTerra ® 1 gal/A | −3.64 | −25.40 |
| PhycoTerra ® 0.5 gal/A | −6.36 | −19.84 |

Figure 11:
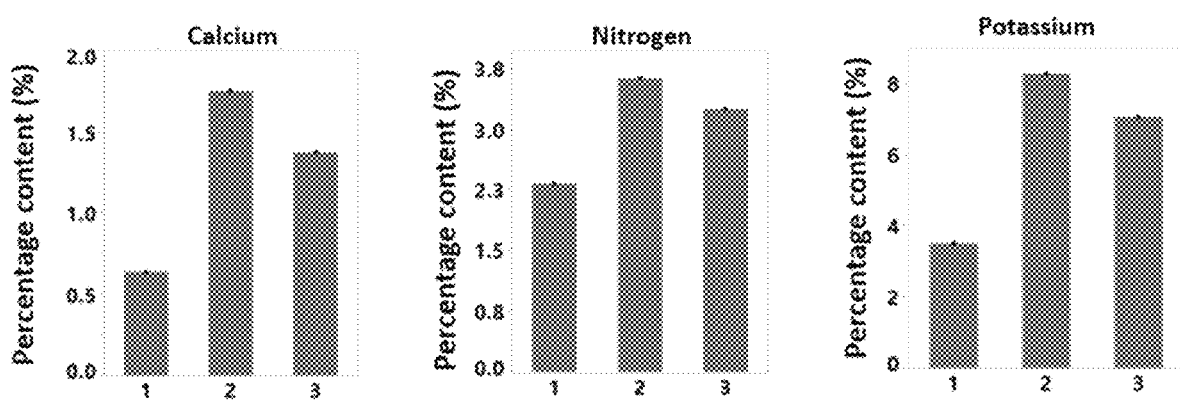
FIG. 11 is a graph showing the effects of PHYCO-TERRA® *Chlorella* microalgae composition on the leaf tissue of romaine lettuce under biotic stress of *Sclerotinia*, wherein the effects are observed in increased levels of Calcium, Nitrogen, and Potassium in the leaf tissue.
Figure 12:
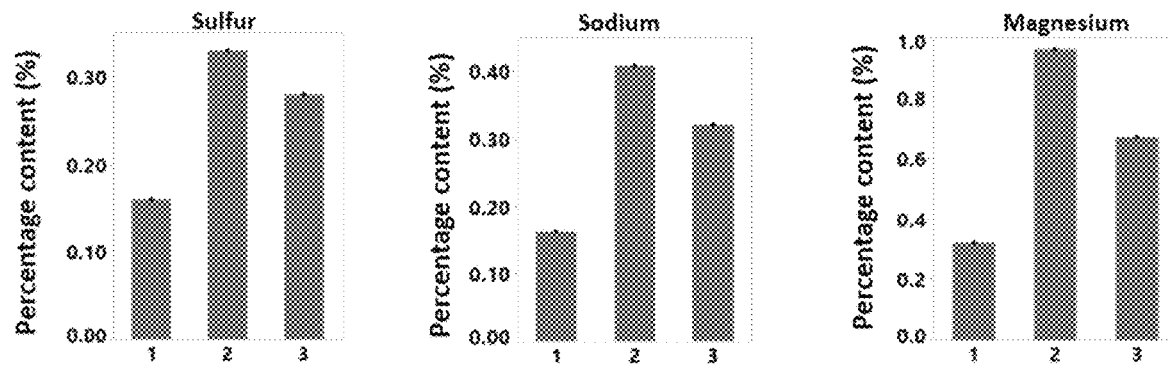
FIG. 12 is a graph showing the effects of PHYCO-TERRA® *Chlorella* microalgae composition on the leaf tissue of romaine lettuce under biotic stress of *Sclerotinia*, wherein the effects are observed in increased levels of Sulfur, Sodium, and Magnesium in the leaf tissue.
Figure 13:
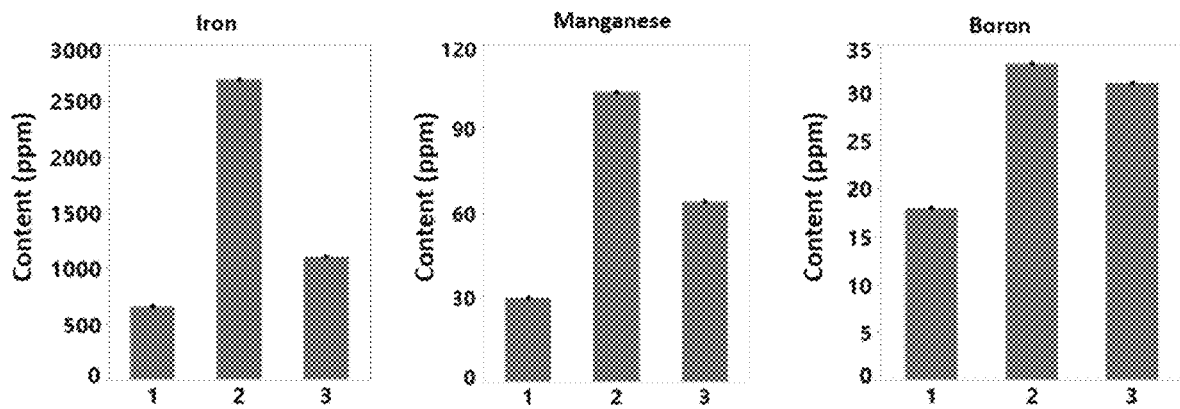
FIG. 13 is a graph showing the effects of PHYCO-TERRA® *Chlorella* microalgae composition on the leaf tissue of romaine lettuce under biotic stress of *Sclerotinia*, wherein the effects are observed in increased levels of Iron, Manganese, and Boron in the leaf tissue.

In addition, as shown in Table 19 and FIGS. 11-13, leaf tissue showed higher levels of calcium, nitrogen, potassium, magnesium, sodium, sulfur, manganese, boron and iron after application of PHYCOTERRA® *Chlorella* microalgae composition.

TABLE 19

| Leaf Tissue Analysis | | | | | | | | | | |
|---|---|---|---|---|---|---|---|---|---|---|
| Treatment number | Treatments | % Calcium | % Nitrogen | % Potassium | % Sulfur | % Sodium | % Magnesium | Iron ppm | Manganese ppm | Boron ppm |
| 1 | Untreated | 0.64 | 2.32 | 3.48 | 0.16 | 0.162 | 0.32 | 658 | 30 | 18 |
| 2 | PhycoTerra ® 1 gal/A | 1.76 | 3.63 | 8.24 | 0.33 | 0.408 | 0.96 | 2691 | 103 | 33 |
| 3 | PhycoTerra ® 0.5 gal/A | 1.38 | 3.25 | 7.04 | 0.28 | 0.321 | 0.67 | 1105 | 64 | 31 |

Example 9

A field trial was initiated in Spreckles, Calif. on Mar. 28, 2019. This trial tested the efficacy of PHYCOTERRA® Chlorella microalgae composition under biotic stress conditions in lettuce. The pathogen that was inoculated into the soil and evaluated in this trial was 22,500 CFU/g *Verticillium dahlia*, a common soil borne pathogen for this crop. The experiment used three different treatments with different rates and numbers of applications (see Table 20).

TABLE 20

Treatments

| Treatment number | Product | Application Rate (Gal/A) |
|---|---|---|
| 1 | Untreated | N/A |
| 2 | PhycoTerra® 1 gal/A | 1 (2 applications, one at transplant and one month later) |
| 3 | PhycoTerra® 0.5 gal/A | 0.5 (5 applications at weekly intervals) |

The first application of PHYCOTERRA® Chlorella microalgae composition was applied right after transplanting lettuce seedlings via soil injection shank, while the other applications were administered via drip irrigation. Six replications were used in a randomized complete block design experiment. After 62 days, the trial was harvested; also soil and leaf tissue analysis were carried out.

Figure 14:
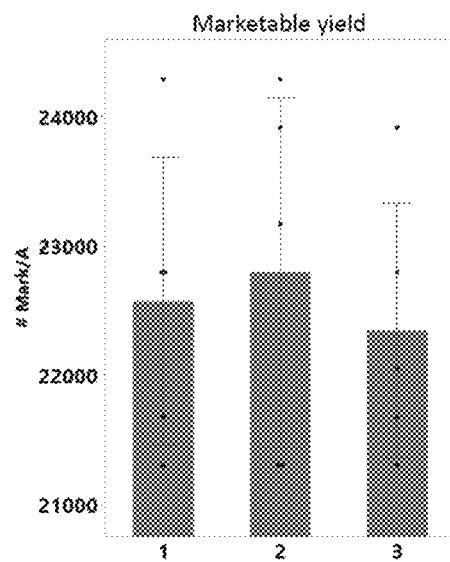
FIG. 14 is a graph showing the effects of PHYCO-TERRA® *Chlorella* microalgae composition on yield of romaine lettuce under biotic stress of *Verticillium dahlia*, wherein there was no significant difference observed in the average yield of lettuce.
Figure 15:
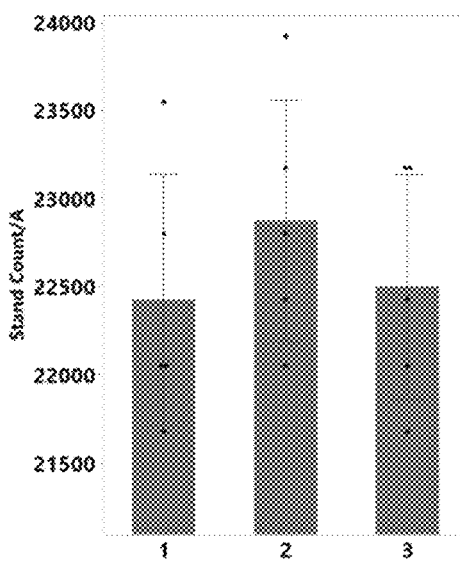
FIG. 15 is a graph showing the effects of PHYCO-TERRA® *Chlorella* microalgae composition on stand count of romaine lettuce under biotic stress of *Verticillium dahlia*, wherein there was no significant difference observed in the stand count of lettuce.

As shown in Tables 21-22 and corresponding FIGS. 14-15, the results showed no significant difference among treatments in yield (Table 21 and FIG. 14) or stand count (Table 22 and FIG. 15) of lettuce.

TABLE 21

Lettuce Yield

| Treatment | Average |
|---|---|
| Untreated | 22574.21 |
| PhycoTerra® 1 gal/a | 22798.454 |
| PhycoTerra® 0.5 gal/a | 22349.962 |
| Average Change (%) | |
| PhycoTerra® 1 gal/a | 1 |
| PhycoTerra® 0.5 gal/a | −1 |

TABLE 22

Lettuce Stand Count

| Treatment | Average |
|---|---|
| Untreated | 22424.714 |
| PhycoTerra® 1 gal/a | 22873.206 |
| PhycoTerra® 0.5 gal/a | 22499.46 |
| Average Change (%) | |
| PhycoTerra® 1 gal/a | 2 |
| PhycoTerra® 0.5 gal/a | 0.3 |

Figure 16:
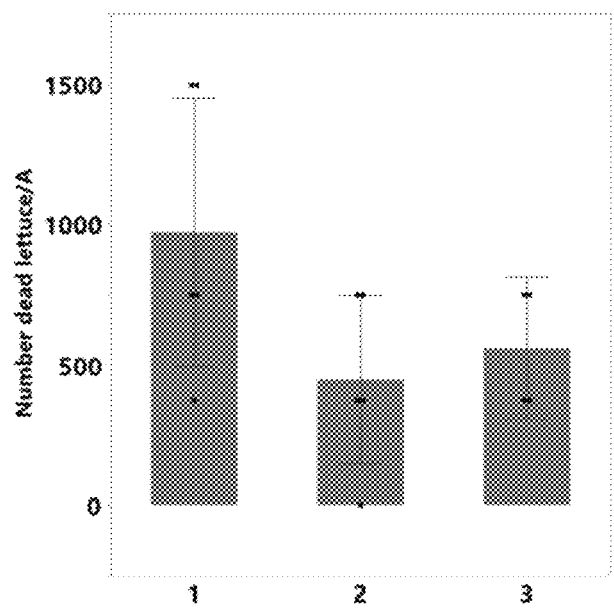
FIG. 16 is a graph showing the effects of PHYCO-TERRA® *Chlorella* microalgae composition on resilience of romaine lettuce under biotic stress of *Verticillium dahlia*, wherein the effects are observed in a reduction of dead lettuce.

However, Table 23 and FIG. 16 show that a 54% and 42% reduction of dead lettuce with two applications of PHYCOTERRA® Chlorella microalgae composition at 1 gal/A and five applications of PHYCOTERRA® Chlorella microalgae composition at 0.5 gal/A respectively were observed.

TABLE 23

Lettuce Drop Per Acre

| Treatment | Average |
|---|---|
| Untreated | 971.738 |
| PhycoTerra® 1 gal/a | 448.496 |
| PhycoTerra® 0.5 gal/a | 560.62 |
| Average Change (%) | |
| PhycoTerra® 1 gal/a | −54 |
| PhycoTerra® 0.5 gal/a | −42 |

Figure 17:
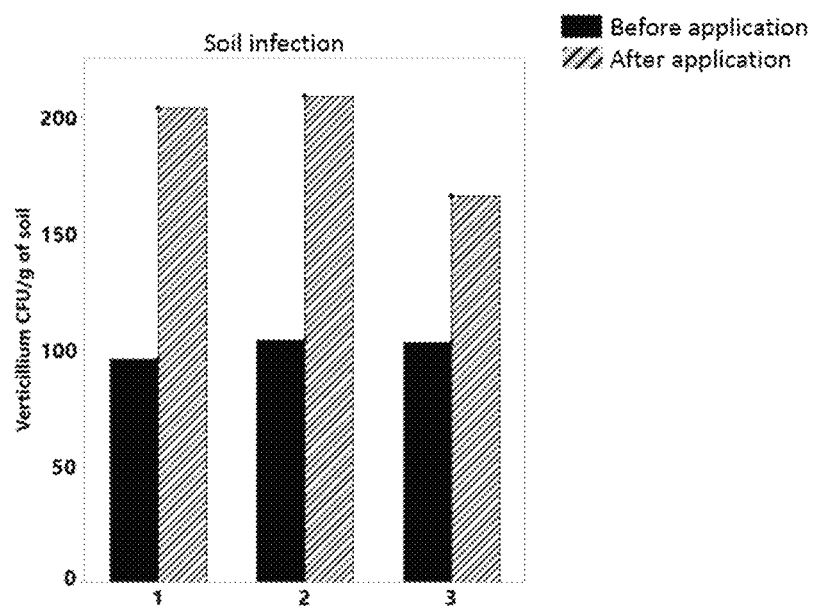
FIG. 17 is a graph showing the effects of PHYCO-TERRA® *Chlorella* microalgae composition on soil of romaine lettuce under biotic stress of *Verticillium dahlia*, wherein the effects are observed in a reduction of *Verticillium dahlia* colony formation in the soil.

Soil analysis was conducted and showed a 19% reduction of *Verticillium dahlia* in soil after 5 applications of PHYCOTERRA® Chlorella microalgae composition at 0.5 gal/A (see Table 24 and FIG. 17).

TABLE 24

*Verticillium* CFU Count

| Treatment | CFU (Colony formation unit)/g soil |
|---|---|
| Untreated | 204 |
| PhycoTerra® 1 gal/a | 209 |
| PhycoTerra® 0.5 gal/a | 166 |
| Average Change (%) | |
| PhycoTerra® 1 gal/a | 2 |
| PhycoTerra® 0.5 gal/a | −19 |

Figure 18:
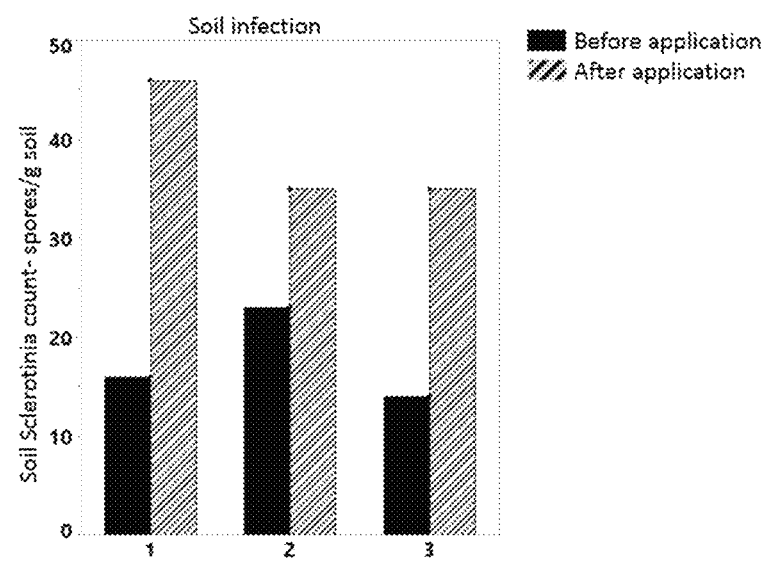
FIG. 18 is a graph showing the effects of PHYCO-TERRA® *Chlorella* microalgae composition on soil of romaine lettuce under biotic stress of *Sclerotinia*, wherein the effects are observed in a reduction of *Sclerotinia* spores in the soil.

Moreover, another soil borne pathogen such as *Sclerotinia* was screened and results showed a 24% reduction in number of spores in the soil after treatment with PHYCOTERRA® Chlorella microalgae composition (Table 25 and FIG. 18).

TABLE 25

*Sclerotinia* Spores Soil

| Treatment | Spore/g soil |
|---|---|
| Untreated | 46 |
| PhycoTerra® 1 gal/a | 35 |
| PhycoTerra® 0.5 gal/a | 35 |
| Average Change (%) | |
| PhycoTerra® 1 gal/a | −24 |
| PhycoTerra® 0.5 gal/a | −24 |

Figure 19:
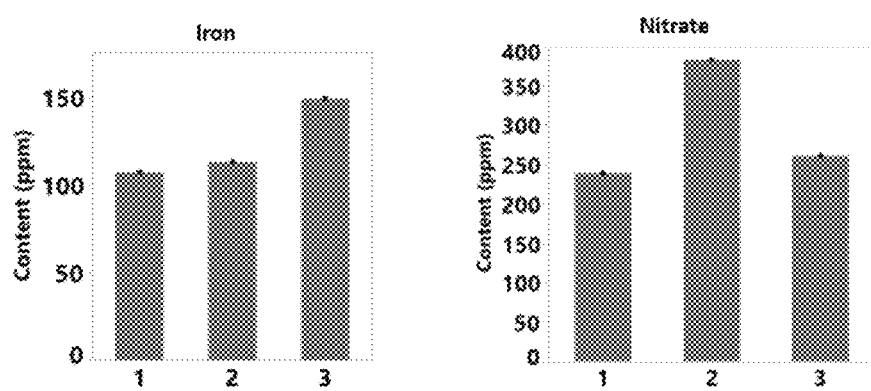
FIG. 19 is a graph showing the effects of PHYCO-TERRA® *Chlorella* microalgae composition on the leaf tissue of romaine lettuce under biotic stress of *Verticillium dahlia*, wherein the effects are observed in increased levels of Iron and Nitrate in the leaf tissue.

Lastly, leaf tissue analysis was carried out 50 days post-transplant. Higher levels of iron and nitrate deposited in the leaf tissue were observed after application of PHYCOTERRA® Chlorella microalgae composition were observed (see Table 26 and FIG. 19).

TABLE 26

Leaf Tissue Analysis

| Treatment number | Treatments | Iron ppm | Nitrate ppm |
|---|---|---|---|
| 1 | Untreated | 107 | 239 |
| 2 | PhycoTerra® 1 gal/A | 113 | 383 |
| 3 | PhycoTerra® 0.5 gal/A | 149 | 261 |

Example 10

A greenhouse study was initiated in a greenhouse on Dec. 6, 2018 where PHYCOTERRA® Chlorella microalgae composition was tested to determine its effects on *verticillium* wilt (*Verticillium dahlia*) on a commodity crop such as cotton. The experiment used six different treatments with different application rates and timing (see Table 27).

TABLE 27

Study Parameters
TRIAL SUMMARY

| | |
|---|---|
| Crop | Cotton |
| Location | Greenhouse |
| Experiment design | RCBD |
| Seeding date | Dec. 6, 2018 |
| Harvest | Apr. 16, 2019 |
| Pot dimensions | 5-gal buckets |
| Planting density | 1 plant/pot |
| Soil type | Loam silt |
| Pathogen | *Verticillium dahlia* (108 microsclereotia/g soil) |
| Replication | 6 |
| Product applied | In-furrow ($1^{st}$); drenching |

In addition, six replications were used in a randomized complete block design. The first application of PHYCOTERRA® *Chlorella* microalgae composition was at seeding via in-furrow, the other applications were via drenching. The type of soil used in this study was silt loam. The final concentration of pathogen in the soil was 108 microsclerotia/g soil. After 131 days, the number of plants with wilt signs were counted; also, the number and weight of bolls was collected.

As shown in Table 28, it was observed that application of PHYCOTERRA® *Chlorella* microalgae composition at 1% (monthly application) reduced the infection of plants with *Verticillium* wilt, in comparison to the other treatments.

TABLE 28

Infection of Plants with *Verticillium*

| Treatment | Description | Frequency of product application | Total number of applications | Plants with sign of wilt | Total plants | Percentage of infection (%) |
|---|---|---|---|---|---|---|
| 1 | Pathogen | NA | 0 | 4 | 6 | 67 |
| 2 | Pathogen + PhycoTerra ® 1% | Once at seeding | 1 | 6 | 6 | 100 |
| 3 | Pathogen + PhycoTerra ® 1% | Monthly | 4 | 2 | 6 | 33 |
| 4 | Pathogen + PhycoTerra ® 3% | Once at seeding | 1 | 5 | 6 | 83 |
| 5 | Pathogen + PhycoTerra ® 1% | Bi-weekly (6 weeks) | 4 | 5 | 6 | 83 |
| 6 | No pathogen + PhycoTerra ® 1% | Bi-weekly (6 weeks) | 4 | 0 | 6 | 0 |

Figure 20:
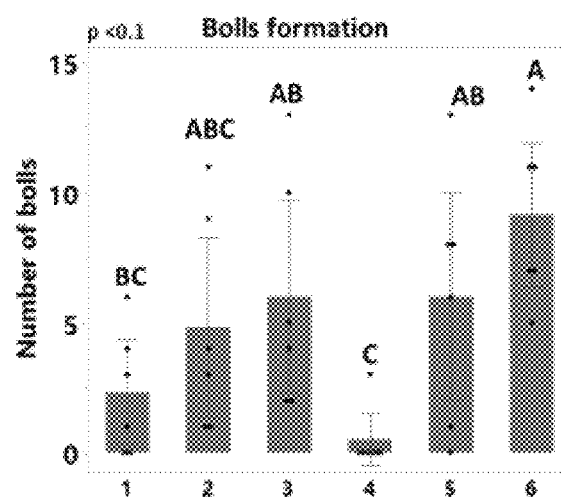
FIG. 20 is a graph showing the effects of PHYCO-TERRA® *Chlorella* microalgae composition on yield of cotton under biotic stress of *Verticillium dahlia*, wherein the effects are observed in an increase in the number of cotton bolls.
Figure 21:
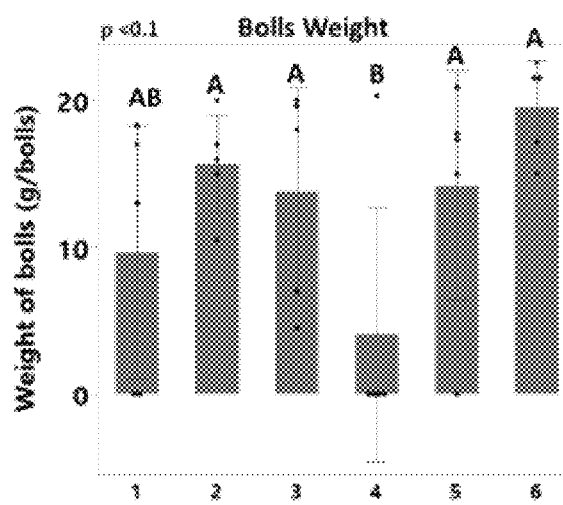
FIG. 21 is a graph showing the effects of PHYCO-TERRA® *Chlorella* microalgae composition on yield of cotton under biotic stress of *Verticillium dahlia*, wherein the effects are observed in an increase in the weight of the cotton bolls.

Regarding the number and weight of bolls; results show that there is a positive trend in increasing the number of bolls (see Table 29 and FIG. 20) and producing bigger bolls (see Table 30 and FIG. 21) in all treatments of 1% PHYCOTERRA® *Chlorella* microalgae composition application at different treatment schedules (monthly, bi-weekly and once a seeding).

TABLE 29

Number of Cotton Bolls

| Treatment | Average |
|---|---|
| 1 | 2.3 |
| 2 | 4.8 |
| 3 | 6.0 |
| 4 | 0.5 |

TABLE 29-continued

Number of Cotton Bolls

| Treatment | Average |
|---|---|
| 5 | 6.0 |
| 6 | 9.2 |
| Difference (%) | |
| 2 | 107.1 |
| 3 | 157.1 |
| 4 | −78.6 |
| 5 | 157.1 |

TABLE 30

Weight of Cotton Bolls

| Treatment | Average (g/bolls) |
|---|---|
| 1 | 9.7 |
| 2 | 15.7 |
| 3 | 13.8 |
| 4 | 4.1 |
| 5 | 14.2 |
| 6 | 19.5 |
| Difference (%) | |
| 2 | 62.4 |
| 3 | 42.8 |
| 4 | −57.9 |
| 5 | 46.7 |

This increase in number of bolls (Table 29 and FIG. 20) and in the size of the bolls (Table 30 and FIG. 21) shows that PHYCOTERRA® *Chlorella* microalgae composition causes an increase in yield of cotton under the biotic stress condition of *Verticillium dahlia*.

In comparison to the untreated control, some of the treatments with PHYCOTERRA® *Chlorella* microalgae composition (all 1% application at different timing) increased productivity of bolls even when plants showed signs of wilt.

It will be understood that various modifications may be made to the embodiments disclosed herein. Therefore, the above description should not be construed as limiting, but merely as exemplifications of preferred embodiments. Those skilled in the art will envision other modifications within the scope and spirit of the claims appended hereto. All patents and references cited herein are explicitly incorporated by reference in their entirety.

What is claimed is:

1. A liquid agriculture composition for administering to soil in the immediate vicinity of a plant, seedling, or seed, the liquid composition comprising an amount of pasteurized microalgae cells that is effective to reduce incidence of a fungal pathogen in the plant compared to a substantially identical population of untreated plants, wherein the pasteurized microalgae cells comprise pasteurized *Aurantiochytrium* cells subjected to an extraction process to remove oils from the *Aurantiochytrium* cells, and wherein the fungal pathogen is one of *Botrytis, Macrophomina, Rhizoctonia solani, Sclerotinia sclerotiorum*, and *Verticillium* wherein the pasteurized *Aurantiochytrium* cells are pasteurized at a temperature ranging from 50° C. up to 90° C..

2. The composition of claim 1, wherein the pasteurized *Aurantiochytrium* cells are harvested when the *Aurantiochytrium* cells comprise approximately 60% lipid.

3. The composition of claim 1, wherein the pasteurized *Aurantiochytrium* cells are harvested when the *Aurantiochytrium* cells comprise approximately 45% lipid.

4. The composition of claim 1, wherein the pasteurized *Aurantiochytrium* cells are harvested when the *Aurantiochytrium* cells comprise less than 40% lipid.

5. The composition of claim 1, wherein the composition includes 0.0001-1% by weight of the microalgae biomass or extract.

6. The composition of claim 1, wherein the composition includes 5-30% solids by weight of microalgae cells.

7. An agriculture composition for administering to soil in the immediate vicinity of a plant, seedling, or seed, the liquid composition comprising an amount of pasteurized microalgae cells that is effective to reduce incidence of a fungal pathogen in the plant compared to a substantially identical population of untreated plants,
the composition comprising at least one of:
pasteurized *Galdieria* cells that have been grown in axenic mixotrophic conditions,
pasteurized *Spirulina* cells that have been grown in non-axenic phototrophic conditions,
pasteurized *Isochrysis* cells that have been grown in non-axenic phototrophic conditions, and
pasteurized *Aurantiochytrium* cells that have been grown in non-axenic heterotrophic conditions and harvested when the *Aurantiochytrium* cells comprise approximately 60% lipid,
wherein the at least one of the pasteurized *Aurantiochytrium* cells, pasteurized *Galdieria* cells, pasteurized *Isochrysis* cells, and pasteurized *Spirulina* cells are pasteurized at a temperature ranging from 50° C. up to 90° C.

8. The composition of claim 7 wherein the fungal pathogen is one of *Botrytis, Macrophomina, Rhizoctonia solani, Sclerotinia sclerotiorum*, and *Verticillium*.

9. The composition of claim 7, wherein the composition is a liquid composition.

10. The composition of claim 7, wherein the composition includes 0.0001-1% by weight of microalgae biomass or extract.

11. The composition of claim 7, wherein the composition includes 5-30% solids by weight of the microalgae cells.

12. The composition of claim 7, wherein the composition comprises pasteurized *Spirulina* cells that have been grown in non-axenic phototrophic conditions.

13. An agriculture composition for administering to soil in the immediate vicinity of a plant, seedling, or seed, the liquid composition comprising an amount of pasteurized microalgae cells that is effective to reduce incidence of a fungal pathogen in the plant compared to a substantially identical population of untreated plants, the composition comprising at least one of pasteurized *Aurantiochytrium* cells, pasteurized *Galdieria* cells, pasteurized *Haematococcus* cells, pasteurized *Isochrysis* cells, and pasteurized *Spirulina* cells, wherein the at least one of the pasteurized *Aurantiochytrium* cells, pasteurized *Galdieria* cells, pasteurized *Haematococcus* cells, pasteurized *Isochrysis* cells, and pasteurized *Spirulina* cells are pasteurized at a temperature ranging from 50° C. up to 90° C., and wherein the fungal pathogen is one of *Botrytis, Macrophomina, Rhizoctonia solani, Sclerotinia sclerotiorum*, and *Verticillium* and the composition further comprises a stabilizer to prevent proliferation of unwanted contaminants in the composition, and wherein the stabilizer is at least one of potassium sorbate, phosphoric acid, ascorbic acid, sodium benzoate and citric acid.

14. The composition of claim 13, wherein the composition is a liquid composition.

15. The composition of claim 13, wherein the composition includes 0.0001-1% by weight of microalgae biomass or extract.

16. The composition of claim 13, wherein the composition includes 5-30% solids by weight of the microalgae cells.

17. The composition of claim 13, wherein the composition comprises pasteurized *Spirulina* cells.

18. The composition of claim 13, wherein the composition comprises pasteurized *Aurantiochytrium* cells.

* * * * *